(12) United States Patent
Kitahara et al.

(10) Patent No.: US 12,359,791 B2
(45) Date of Patent: Jul. 15, 2025

(54) OPTICAL LENS AND LIGHTING DEVICE

(71) Applicant: NICHIA CORPORATION, Anan (JP)

(72) Inventors: Wataru Kitahara, Kamiina-gun (JP); Takanori Aruga, Suwa-gun (JP)

(73) Assignee: NICHIA CORPORATION, Anan (JP)

( * ) Notice: Subject to any disclaimer, the term of this patent is extended or adjusted under 35 U.S.C. 154(b) by 853 days.

(21) Appl. No.: 17/555,502

(22) Filed: Dec. 20, 2021

(65) Prior Publication Data

US 2022/0196998 A1 Jun. 23, 2022

(30) Foreign Application Priority Data

Dec. 22, 2020 (JP) .................. 2020-212900

(51) Int. Cl.
*F21V 7/00* (2006.01)
*F21V 5/00* (2018.01)

(52) U.S. Cl.
CPC ............ *F21V 5/002* (2013.01); *F21V 7/0091* (2013.01)

(58) Field of Classification Search
CPC .... G02B 19/0061; G02B 19/0028; F21V 3/04
See application file for complete search history.

(56) References Cited

U.S. PATENT DOCUMENTS

| | | | | |
|---|---|---|---|---|
| 2011/0075418 A1* | 3/2011 | Mallory | .................. | F21V 5/08 362/326 |
| 2011/0085344 A1* | 4/2011 | Koizumi | ................ | G02B 6/002 362/509 |
| 2011/0261570 A1* | 10/2011 | Okada | .................. | F21S 43/239 362/311.06 |
| 2012/0075555 A1* | 3/2012 | Parker | .................. | G02B 6/008 349/62 |
| 2014/0313758 A1* | 10/2014 | Nakaya | ................. | F21S 41/322 362/516 |
| 2015/0085526 A1* | 3/2015 | Cheng | ................. | G02B 6/0036 362/617 |
| 2017/0115531 A1 | 4/2017 | Hiraka | | |
| 2021/0396980 A1* | 12/2021 | Matikainen | ........ | G02B 19/0028 |

FOREIGN PATENT DOCUMENTS

| | | |
|---|---|---|
| JP | 2006-278309 | 10/2006 |
| JP | 2008-130532 | 6/2008 |
| JP | 2012022943 A * | 2/2012 |
| JP | 2012-069363 | 4/2012 |
| JP | 2012-190677 | 10/2012 |
| JP | 2012-231023 | 11/2012 |
| JP | 2013-048068 | 3/2013 |
| JP | 2015-197624 | 11/2015 |
| JP | 2017-010788 | 1/2017 |
| JP | 2019-216034 | 12/2019 |
| WO | WO 2015/151675 | 10/2015 |

* cited by examiner

*Primary Examiner* — Fatima N Farokhrooz

(74) *Attorney, Agent, or Firm* — MORI & WARD, LLP

(57) ABSTRACT

An optical lens includes a first light incident portion where a narrow-angle light from a light source is incident, a second light incident portion where a wide-angle light from the light source is incident, a first total reflecting portion that totally reflects incident light from the first light incident portion, a second total reflecting portion that totally reflects incident light from the second light incident portion, and a light exiting portion that emits light totally reflected at the second total reflecting portion. The second total reflecting portion allows light totally reflected at the first total reflecting portion to pass through.

20 Claims, 16 Drawing Sheets

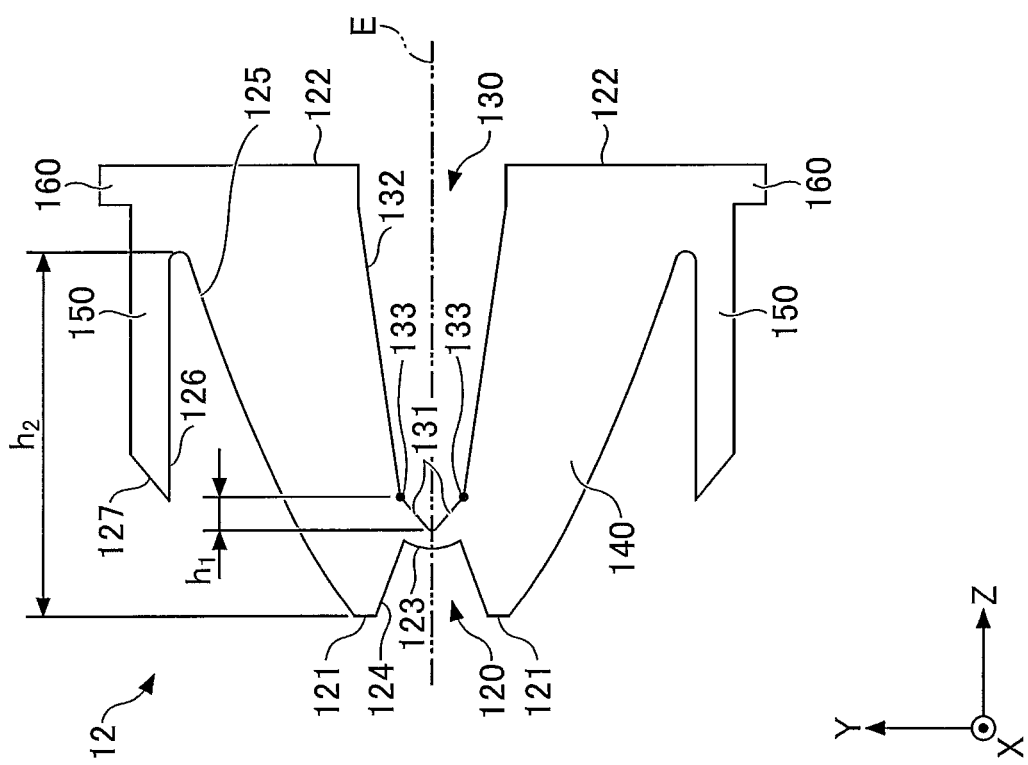
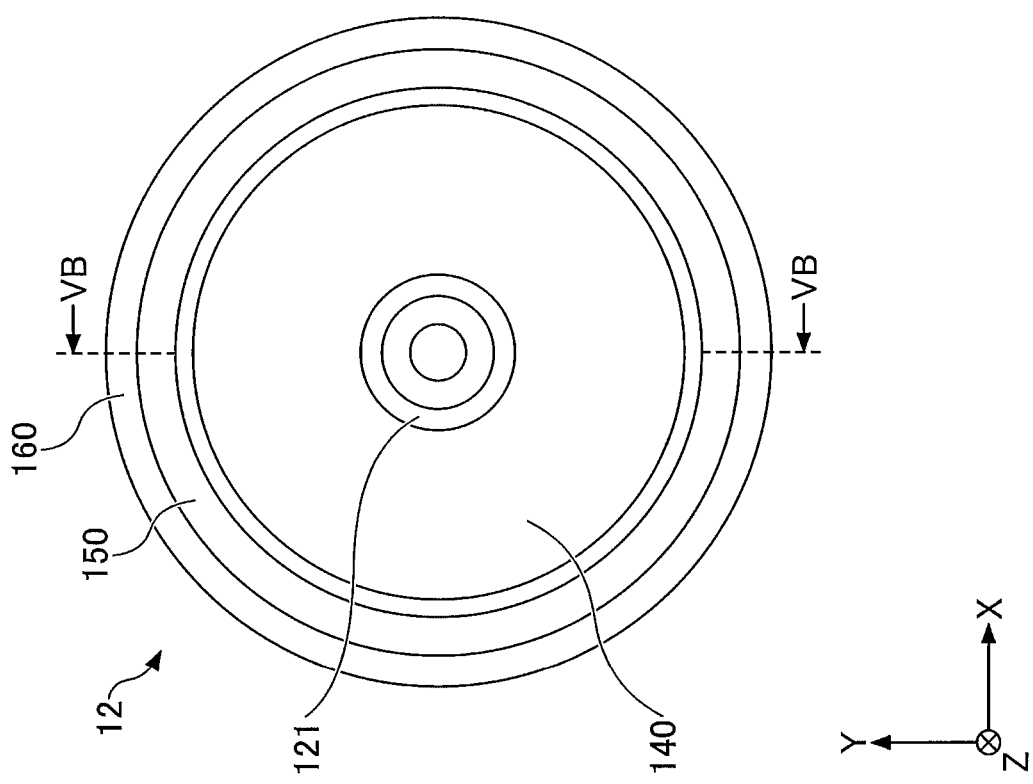

FIG.11
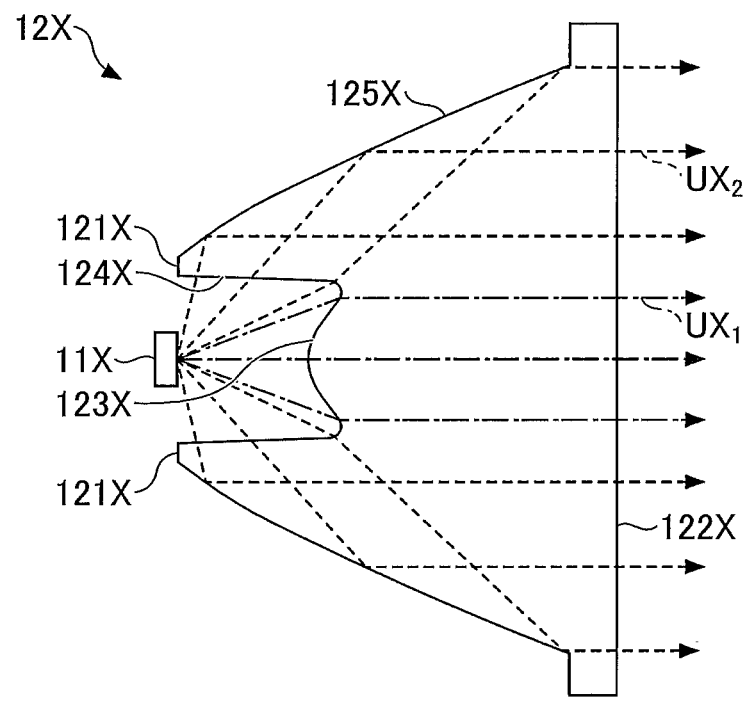
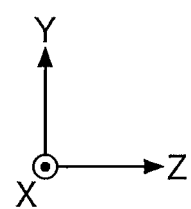

FIG.12A
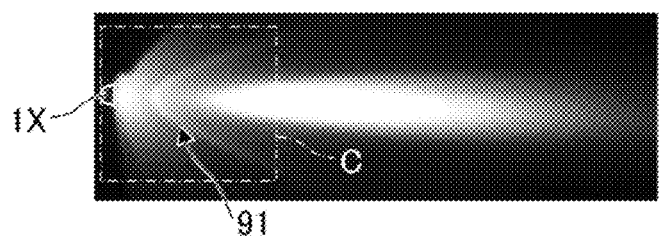
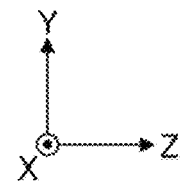
FIG.12B
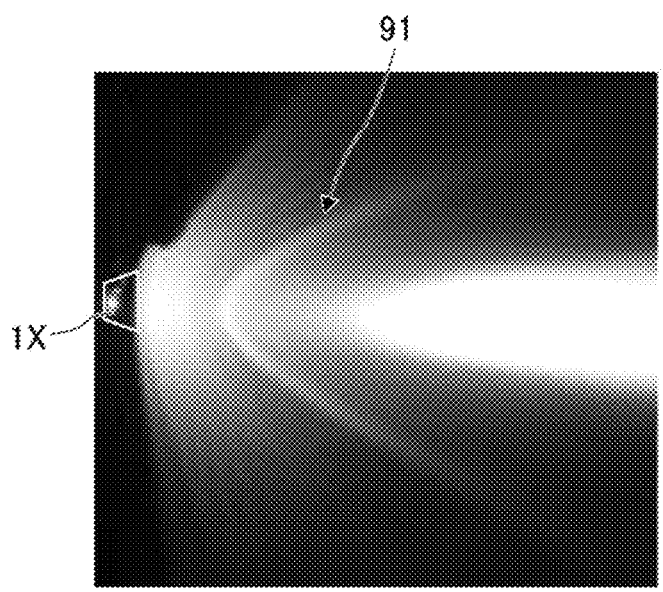
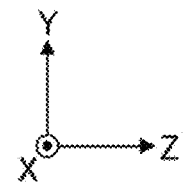
FIG.12C
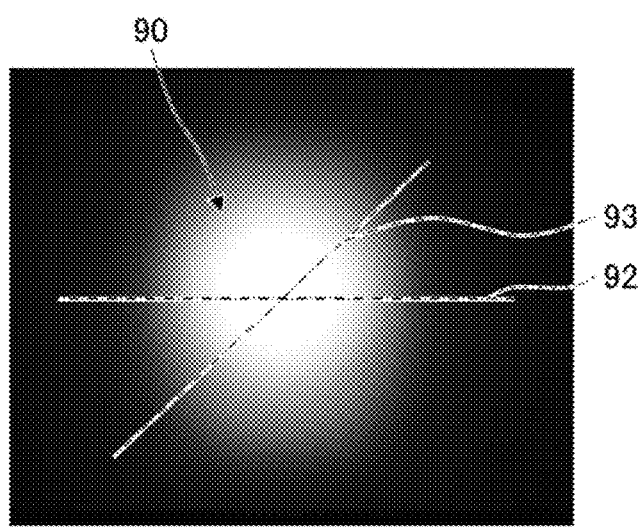
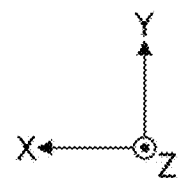

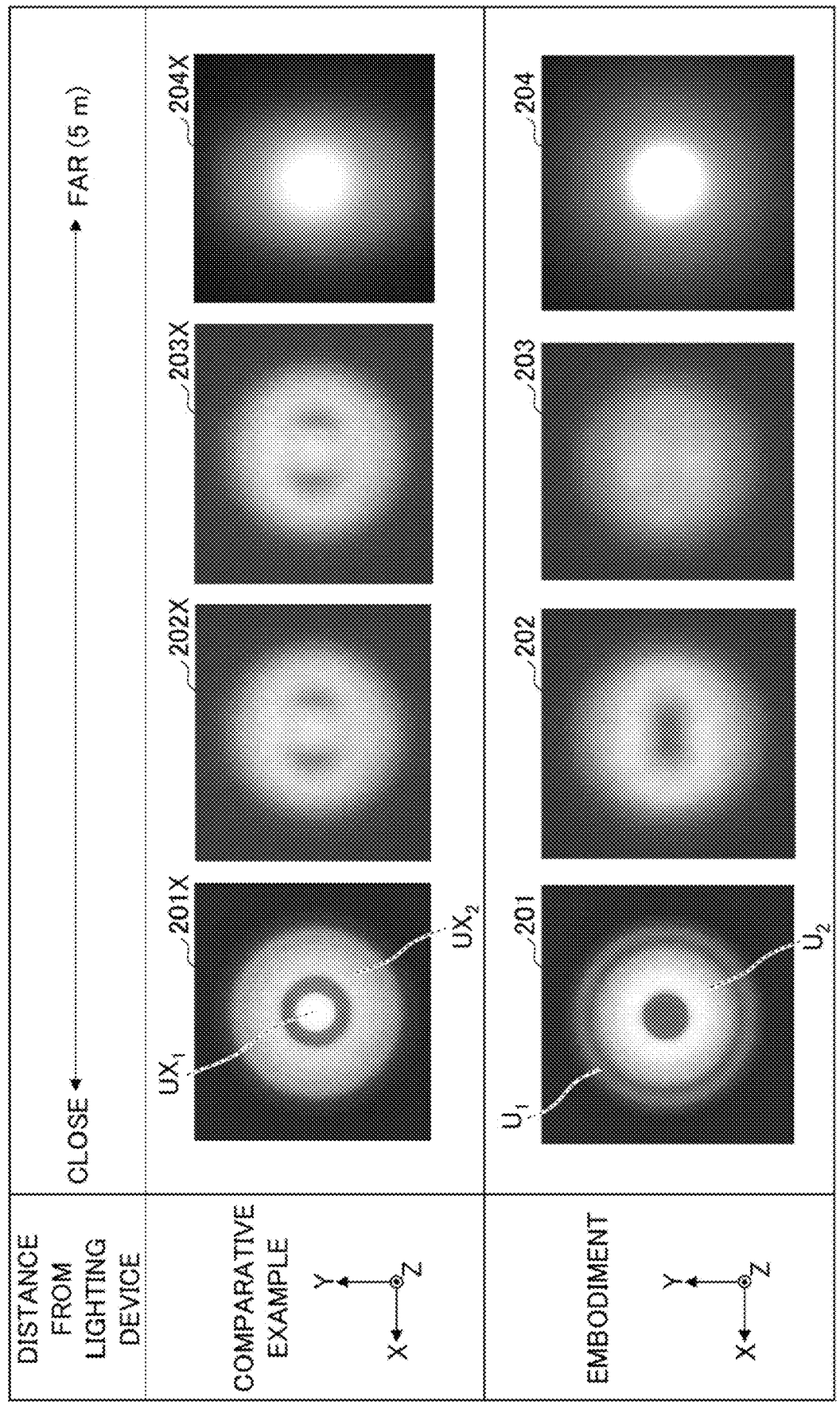

OPTICAL LENS AND LIGHTING DEVICE

CROSS-REFERENCE TO RELATED APPLICATIONS

The present application claims priority under 35 U.S.C. § 119 to Japanese Patent Application No. 2020-212900, filed Dec. 22, 2020. The contents of this application are incorporated herein by reference in their entirety.

BACKGROUND

The present disclosure relates to an optical lens and a lighting device.

A known optical lens includes a reflecting portion configured to reflect light entered from a light source and a light exiting portion through which light entered from a light source exits. There is also a known configuration in which a portion of light traveling toward an opposing region opposing a light source exits through a peripheral portion that is located outward of the opposing region and that does not oppose the light source (for example, see JP 2006-278309 A).

SUMMARY

However, in the device of JP 2006-278309 A, the optical lens may have an increased size.

Accordingly, there is a need to hinder an increase in the size of an optical lens.

An optical lens according to an embodiment of the present disclosure includes a first light incident portion on which a narrow-angle light from a light source is incident; a second light incident portion on which a wide-angle light from the light source is incident; a first total reflecting portion configured to totally reflect the light incident on the first light incident portion; a second total reflecting portion configured to totally reflect the light incident on the second light incident portion; and a light exiting portion through which the light totally reflected at the second total reflecting portion exits. The second total reflecting portion is configured to transmit light totally reflected at the first total reflecting portion.

Also, a lighting device according to an embodiment of the present disclosure includes the optical lens described above and the light source described above.

According to an embodiment of the present disclosure, an increase in the size of an optical lens can be reduced.

BRIEF DESCRIPTION OF DRAWINGS

FIG. 4A is a schematic perspective view from a light incident side.

FIG. 4B is a schematic perspective view from a light exiting side.

FIGS. 5A and 5B are schematic diagrams illustrating an example of the configuration of an optical lens according to one embodiment.

FIG. 5A is a schematic plan view when viewed from the light incident side.

FIG. 5B is a schematic cross-sectional view taken along a section line VB-VB in FIG. 5A.

FIG. 8A is a schematic cross-sectional view taken along line VB-VB in FIG. 5A.

FIG. 8B is a schematic enlarged view of a region F in FIG. 8A.

FIG. 9A is a schematic diagram illustrating an example in which the first total reflecting portion is a conical surface.

FIG. 9B is a schematic diagram illustrating an example in which the first total reflecting portion is a curved surface.

FIG. 11 is a schematic diagram illustrating an example of guiding light by an optical lens according to a comparative example.

FIGS. 12A to 12C are diagrams schematically illustrating examples of light emission from a lighting device according to a comparative example.

FIG. 12A is a diagram when viewed from a side in a direction that intersects the light emission direction.

FIG. 12B is an enlarged view of a region C in FIG. 12A.

FIG. 12C is a diagram when viewed from a side in the light emission direction.

FIG. 13A is a diagram when viewed in a direction that intersects the light emission direction.

FIG. 13B is an enlarged view of a region D in FIG. 13A.

FIG. 13C is a diagram when viewed in the light emission direction.

FIG. 14 is a diagram schematically illustrating an example of patterns of irradiated light at different distances from a lighting device.

FIG. 15A is a schematic diagram illustrating a fly eye lens.

FIG. 15B is a schematic diagram illustrating a roughened surface.

DESCRIPTION OF EMBODIMENTS

Figure 1:
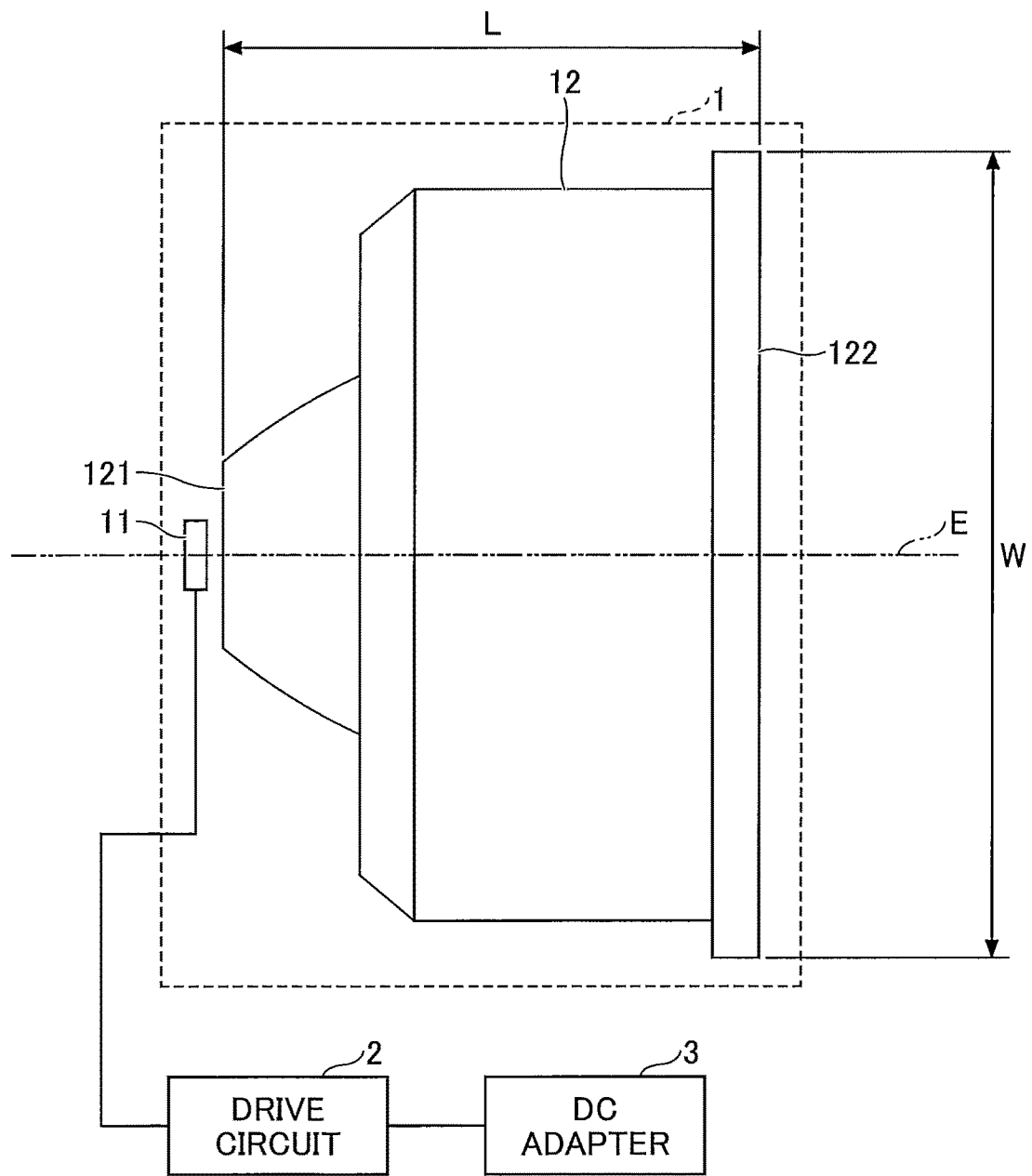
FIG. 1 is a schematic side view illustrating an example of an overall configuration of a lighting device according to one embodiment.

Hereinafter, certain embodiments of the invention will be described with reference to the drawings. In the description below, parts designated with the same reference numerals appearing in a plurality of drawings indicate identical or similar parts or members.

Furthermore, the embodiments described below exemplify an optical lens and a lighting device for giving a concrete form to the technical idea of the present invention, and the present invention is not limited to the embodiments described below. Unless otherwise specified, the dimensions, materials, shapes, relative arrangements, and the like of elements described below are not intended to limit the scope of the present invention to those, but are intended as illustrative. The size, positional relationship, and the like of the members illustrated in the drawings may be exaggerated in order to clarify explanation.

The X direction along the X-axis indicates a predetermined direction in a plane that intersects an optical axis of an optical lens according to an embodiment, the Y direction along the Y-axis indicated a direction orthogonal to the X-axis in the plane, and the Z direction along the Z-axis is a direction along the optical axis.

The direction in which the arrow is oriented in the X direction is indicated as +X (plus X) direction and the direction opposite to the +X direction is indicated as −X (minus X) direction. The direction in which the arrow is oriented in the Y direction is indicated as +Y (plus Y) direction and the direction opposite to the +Y direction is indicated as −Y (minus Y) direction. The direction in which the arrow is oriented in the Z direction is indicated as +Z (plus Z) direction and the direction opposite to the +Z direction is indicated as −Z (minus Z) direction. In an embodiment, light exits the optical lens in the +Z-direction, for example. This does not limit the orientation of the optical lens and the lighting device when used, and the optical lens and the lighting device may be oriented in any appropriate directions.

Embodiments will be described below using a lighting device including an optical lens as an example.

Configuration of Lighting Device 1
Example of Overall Configuration

An overall configuration of a lighting device 1 according to an embodiment will be described with reference to FIG. 1. FIG. 1 is a schematic side view illustrating an example of an overall configuration of the lighting device 1. As illustrated in FIG. 1, the lighting device 1 includes a light-emitting portion 11 and an optical lens 12.

The light-emitting portion 11 is electrically connected to a drive circuit 2. The drive circuit 2 is supplied with a direct current (DC) voltage from a DC adapter 3, and a drive voltage is applied to the light-emitting portion 11. The light-emitting portion 11 is an example of a light source that emits light in response to an applied drive voltage.

The light-emitting portion 11 is configured to emit light spreading in a substantially circular shape. The positions of the light-emitting portion 11 and the optical lens 12 are adjusted so that the center axis of the light emitted from the light-emitting portion 11 substantially coincides with an optical axis E, which is the central axis of the optical lens 12. The optical axis E is an example of a lens center axis.

The optical lens 12 is a total internal reflection (TIR) lens utilizing total reflection. The optical lens 12 is substantially axisymmetric about the optical axis E. In one example, the optical lens 12 has a total length L of 25 mm along the optical axis E, and a maximum width W of 35 mm orthogonal to the optical axis E. The optical lens 12 may have dimensions other than above.

Light emitted from the light-emitting portion 11 enters inside the optical lens 12 from a lens end portion 121 side, is guided inside the optical lens 12, and is converted to collimated light (parallel light) substantially parallel to the optical axis E of the optical lens 12. The collimated light exits the optical lens 12 through a light exiting portion 122 located at a side opposite to the lens end portion 121. The lighting device 1 is configured to irradiate collimated light substantially parallel to the optical axis E in the direction along the optical axis E.

The lighting device 1 is secured to a wall or ceiling of a building, for example, and is used for illuminating a space inside or outside of the building. Alternatively, the lighting device 1 can be fixed to a wall of ceiling of a store or a facility and used for downlights, spotlights, indirect lighting, or the like for space rendering of stores or facilities. Also, the lighting device 1 can be provided near an object such as a product or display, and used for illuminating the object. The optical lens 12 is particularly preferable for applications where light emitted from the light-emitting portion 11 is collimated for localized irradiation (spot irradiation).

Configuration Example of Light-Emitting Portion 11

Figure 2:
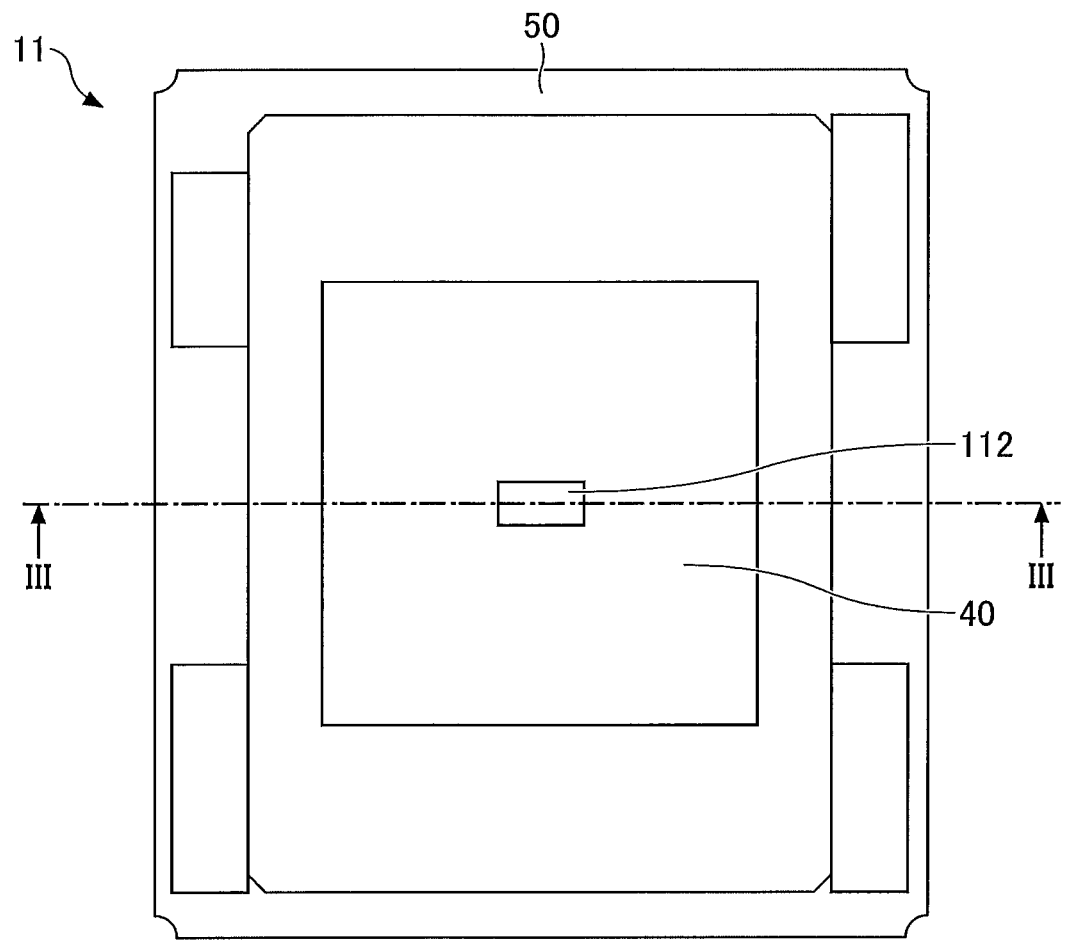
FIG. 2 is a schematic top view of a light-emitting portion of a lighting device according to one embodiment.

Next, the configuration of the light-emitting portion 11 will be described with reference to FIGS. 2 and 3. FIG. 2 is a schematic top view of the light-emitting portion 11, and FIG. 3 is a schematic cross-sectional view taken along a section line III-III in FIG. 2.

Figure 3:
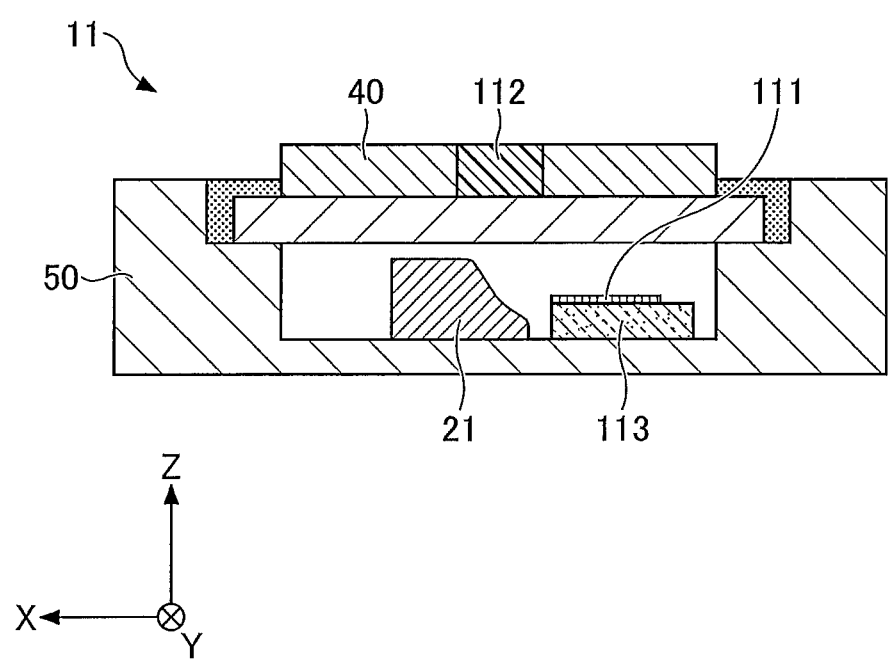
FIG. 3 is a schematic cross-sectional view taken along line III-III in FIG. 2.

As illustrated in FIGS. 2 and 3, the light-emitting portion 11 includes a base 50, a semiconductor laser element 111, a submount 113, a light reflecting portion 21, a phosphor portion 112, and a light shielding portion 40.

The semiconductor laser element 111 is disposed on the upper surface of the submount 113, which is disposed on the upper surface of the base 50, and is configured to emit a laser beam toward the light reflecting portion 21. A semiconductor laser element having a light emission peak wavelength in a range of 320 nm to 530 nm, typically in a range of 430 nm to 480 nm, can be employed for the semiconductor laser element 111. For example, a material including nitride semiconductors is preferable, with examples including a material containing at least one of GaN, InGaN, and AlGaN. Aluminum nitride or silicon carbide can be used for the submount 113, for example.

The light reflecting portion 21 is disposed on the upper surface of the base 50, and reflects a laser beam emitted from the semiconductor laser element 111 in the +Z direction. For the light reflecting portion 21, a light reflecting member mainly formed of a material highly resistant to heat, for example quartz or a glass such as BK7 or a metal such as aluminum and having a light reflecting surface formed of a material having a high reflectivity such as a metal or a dielectric multilayer film can be employed.

The phosphor portion 112 includes a lower surface irradiated with the laser beam and an upper surface serving as a light extraction surface. The phosphor portion 112 contains a phosphor. When irradiated with a laser beam, the phosphor portion 112 is excited and emits fluorescence. Examples of the phosphor include a YAG phosphor, an LAG phosphor, and an α-SiAlON phosphor.

The light shielding portion 40 is disposed surrounding lateral sides of the phosphor portion 112 and serves to reduce the amount of light exiting from regions other than the upper surface of the phosphor portion 112. Other than aluminum oxide, aluminum nitride or the like can be employed for the light shielding portion 40.

The semiconductor laser element 111 is configured to emit laser light, which is light with high coherence. Meanwhile, light emitted from the phosphor portion 112 upon excitation by a laser beam does not have spatial coherence or temporal coherence, so that the light emitted from the phosphor portion 112 is incoherent light. Thus, the light-emitting portion 11 can emit fluorescence emitted from the phosphor portion 112 as incoherent light in the +Z direction.

Configuration Example of Optical Lens 12

Figure 4B:
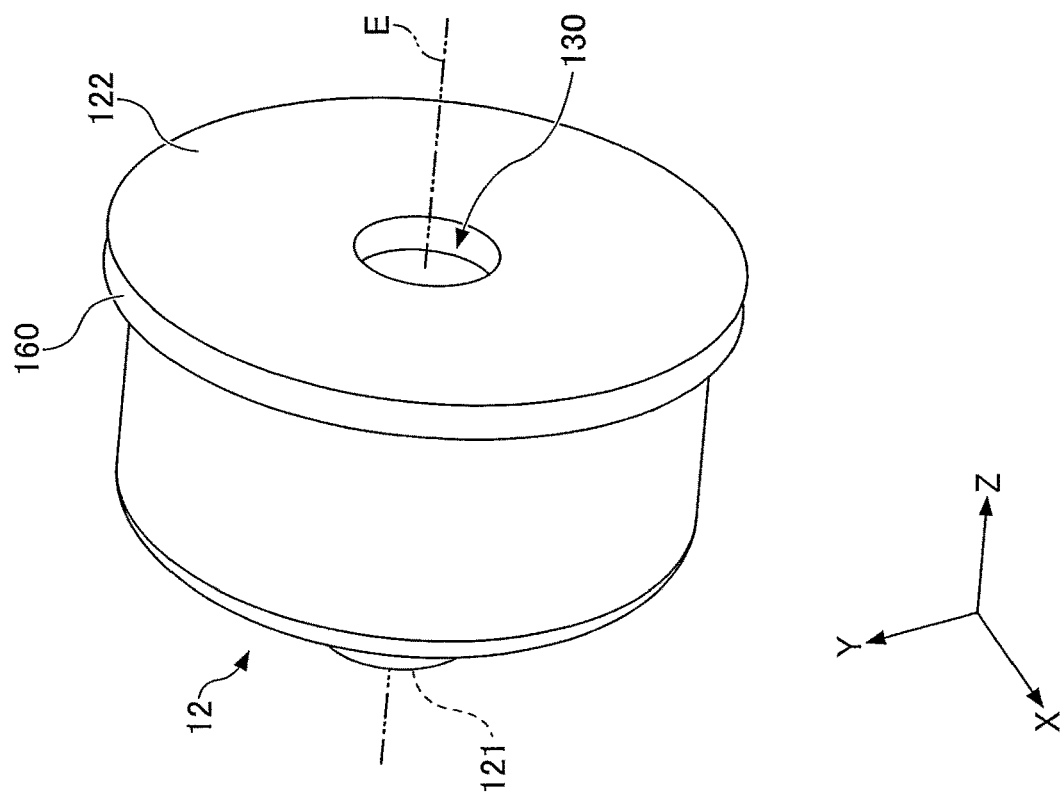
FIGS. 4A and 4B are schematic diagrams illustrating an example of the configuration of an optical lens according to one embodiment.
Figure 4A:
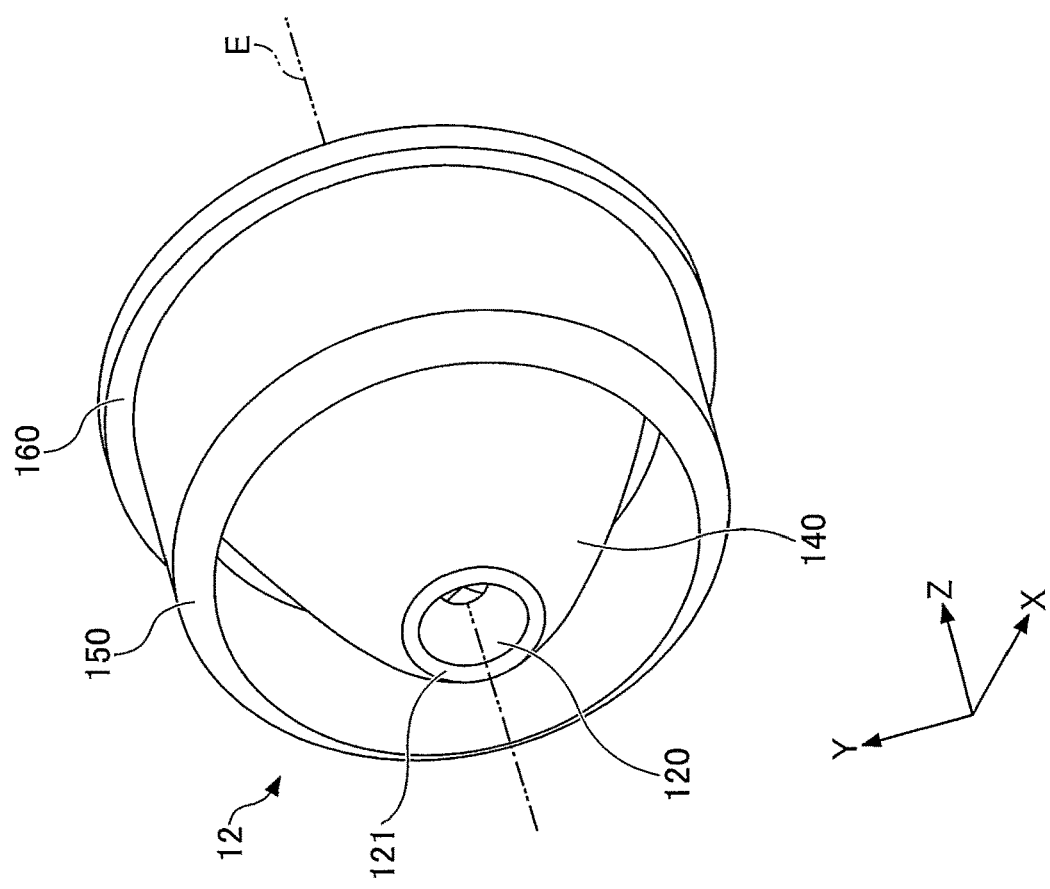

Next, the configuration of the optical lens 12 will be described with reference to FIGS. 4A and 4B and FIGS. 5A and 5B. FIGS. 4A and 4B and FIGS. 5A and 5B are schematic diagrams for describing an example of the configuration of the optical lens 12. FIG. 4A is a schematic perspective view of the optical lens 12 when viewed from the light incident side, and FIG. 4B is a schematic perspective view of the optical lens 12 when viewed from the light exiting side. FIG. 5A is a schematic plan view of the optical lens 12 as seen from the light incident side, and FIG. 5B is a schematic cross-sectional view of the optical lens 12 taken along a section line VB-VB in FIG. 5A.

As illustrated in FIGS. 4A and 4B and FIGS. 5A and 5B, the optical lens 12 overall has a substantially cylindrical shape. The optical axis E and the cylinder axis are substantially aligned with each other. The optical lens 12 includes a first light-guiding portion 140, a second light-guiding portion 150, and an edge portion 160.

The optical lens 12 can be manufactured by, for example, injection-molding a resin material having light transmittance with respect to the light emitted from the light-emitting portion 11. The first light-guiding portion 140, the second light-guiding portion 150, and the edge portion 160 can be integrally formed by injection molding. An acrylic resin (polymethyl methacrylate (PMMA)) having high light transmittance or the like can be preferably used for the resin material.

The optical lens 12 may be manufactured by using other techniques, and other material may be used for the optical lens 12. A technique other than the injection molding may be used, or a resin material other than acrylic resin or a material other than a resin such as glass may be used as long as the material is transmissive to the light emitted from the light-emitting portion 11.

The edge portion 160 is formed along the outer periphery of the light exiting portion 122 in a shape like the brim of a hat. The edge portion 160 is a portion that can be used as an adhesion region when securing the optical lens 12 to a lens barrel or the like. While the edge portion 160 is not necessarily provided, provision of the edge portion 160 allows for securing a region for adhesion to a lens barrel or the like, and light emitted through the optical lens 12 can be hindered from interfering with the adhesive or the like, and thus it is preferable to provide the edge portion 160.

The first light-guiding portion 140 has a shape protruding toward the lens end portion 121 and is substantially axisymmetric about the optical axis E. The first light-guiding portion 140 guides wide-angle light that enters inside the first light-guiding portion 140 through a second light incident portion 124 and causes the light to exit through the light exiting portion 122.

As illustrated in FIGS. 5A and 5B, the first light-guiding portion 140 includes the lens end portion 121, a first light incident portion 123, the second light incident portion 124, a first total reflecting portion 131, and a second total reflecting portion 125.

An incident-side recess portion 120 recessed in the +Z direction from the lens end portion 121 is defined in the lens end portion 121 side of the first light-guiding portion 140. The incident-side recess portion 120 defines a recess having a substantially circular cross-sectional shape in a plane perpendicular to the optical axis E, and the center axis of the incident-side recess portion 120 passing through the center of the substantially circular cross section substantially coincides with the optical axis E. The first light incident portion 123 is located on the bottom surface side of the incident-side recess portion 120, and the second light incident portion 124 is located on the side surface side of the incident-side recess portion 120.

Figure 7:
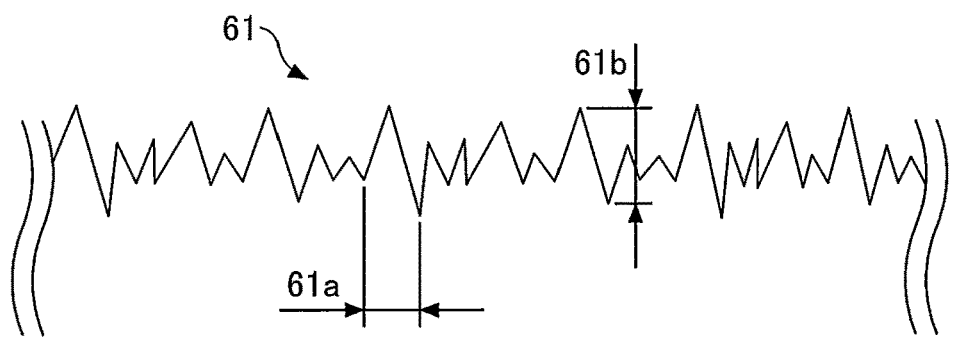
FIG. 7 is a schematic diagram illustrating an example of the configuration of irregularities.

The lens end portion 121 is an end portion of the optical lens 12 on the side on which light emitted from the light-emitting portion 11 is incident. The surface of the lens end portion 121 has irregularities having widths and heights that are approximately equal to or greater than the wavelength of the light emitted from the light-emitting portion 11 and that are randomly varied depending on locations. These irregularities are an example of an incident light attenuation portion that diffuses and attenuates the light incident on the first light-guiding portion 140 through the lens end portion 121. These irregularities are illustrated in FIG. 7.

The first light incident portion 123 includes a curved surface that is substantially axisymmetric about the optical axis E. The first light incident portion 123 is provided at a position on the +Z direction side of the light-emitting portion 11 where the narrow-angle light from the light-emitting portion 11 can be incident.

In the present specification, the term "narrow-angle light" refers to, among lights emitted from the light-emitting portion 11, a light passes through a position on the inner side, i.e., close to the optical axis E. The light with a narrow beam angle enters the first light-guiding portion 140 through the first light incident portion 123.

The second light incident portion 124 includes a tapered surface that is substantially axisymmetric about the optical axis E and that narrows in a direction along the optical axis E opposite to a direction toward the light-emitting portion 11. The second light incident portion 124 is provided at a position on the +Z direction side of the light-emitting portion 11 where the wide-angle light from the light-emitting portion 11 can be incident.

In the present specification, the term "wide-angle light" refers to a portion of the light from the light-emitting portion 11 that passes through a position on the outer side, i.e., separated from the optical axis E. The wide-angle light enters inside the first light-guiding portion 140 through the second light incident portion 124.

The term "narrow angle" in the term "narrow-angle light" means that the spread angle of the light is relatively narrow compared with the angle of wide-angle light, and is generally not limited to an angle called a "narrow angle". In a similar manner, "wide angle" in reference to wide-angle light means that the spread angle of the light is relatively wide compared with the angle of narrow-angle light, and is generally not limited to an angle called a "wide angle".

In addition, the present embodiment is a configuration in which the first light incident portion 123 includes a curved surface that is axisymmetric about the optical axis E, and the second light incident portion 124 includes a tapered surface that is axisymmetric about the optical axis E; however, no such limitation is intended. For example, a configuration can be used in which the first light incident portion 123 includes a tapered surface that is axisymmetric about the optical axis E, and the second light incident portion 124 includes a curved surface that is axisymmetric about the optical axis E.

In the first light-guiding portion 140, the position and size of the first light incident portion 123 are set with respect to the light-emitting portion 11 such that light with a spread of less than a predetermined angle enters inside the first light-guiding portion 140 through the first light incident portion 123. Also, the position and size of the second light incident portion 124 is set with respect to the light-emitting portion 11 such that light with a spread of equal to or greater than a predetermined angle enters inside the first light-guiding portion 140 through the second light incident portion 124. The predetermined angle of the spread angle can be selected as appropriate in accordance with the use of the lighting device 1 or the like.

The first total reflecting portion 131 includes a substantially conical surface that is substantially axisymmetric about the optical axis E and expanding away from the optical axis E in a direction opposite to a direction toward the light-emitting portion 11 along the optical axis E. The first total reflecting portion 131 totally reflects the light that enters inside the first light-guiding portion 140 through the first light incident portion 123.

The shape of the first total reflecting portion 131 is set so that the narrow-angle light that enters inside the first light-guiding portion 140 from the first light incident portion 123 is totally reflected. While it is not necessary that the entirety of the narrow-angle light is totally reflected, to increase the use efficiency of the light emitted from the lighting device 1, the shape of the first total reflecting portion 131 is preferably set so that more of the narrow-angle light is totally reflected.

In the present embodiment, an example of a configuration in which the first total reflecting portion 131 has a substantially conical shape is illustrated. However, the first total reflecting portion 131 may have a curved surface shape substantially axisymmetric about the optical axis E.

The second total reflecting portion 125 includes a curved surface substantially axisymmetric about the optical axis E and totally reflects the light that enters inside the first light-guiding portion 140 through the second light incident portion 124. The shape of the second total reflecting portion 125 is set so that the wide-angle light that enters inside the first light-guiding portion 140 through the second light incident portion 124 is totally reflected.

It is not necessary that the entirety of the wide-angle light is totally reflected, but, to increase the use efficiency of the light emitted from the lighting device 1, the shape of the second total reflecting portion 125 is preferably set so that more of the wide-angle light is totally reflected.

In the present embodiment, the shape of the second total reflecting portion 125 and/or the first total reflecting portion 131 is set such that the light totally reflected at the first total reflecting portion 131 passes through the second total reflecting portion 125. In addition, in the present embodiment, the first total reflecting portion 131 and the second total reflecting portion 125 are arranged such that a range $h_1$ of the first total reflecting portion 131 along the optical axis E is included in a range $h_2$ of the second total reflecting portion 125 along the optical axis E.

The second light-guiding portion 150 has a substantially cylindrical shape substantially axisymmetric about the optical axis E to surround the outer side of the first light-guiding portion 140. The narrow-angle light that is totally reflected at the first total reflecting portion 131 and passes through the second total reflecting portion 125 enters inside the second light-guiding portion 150. The second light-guiding portion 150 guides the narrow-angle light that has entered inside the second light-guiding portion 150 and allow the light to exit through the light exiting portion 122.

As illustrated in FIGS. 5A and 5B, the second light-guiding portion 150 includes a third light incident portion 126 and a third total reflecting portion 127.

The third light incident portion 126 is a band-like portion with a ring shape at the inner surface of the substantially cylindrical second light-guiding portion 150. The narrow-angle light that is totally reflected at the first total reflecting portion 131 and passes through the second total reflecting portion 125 enters inside the second light-guiding portion 150 through the third light incident portion 126.

The third total reflecting portion 127 includes a surface substantially axisymmetric about the optical axis E and expanding away from the optical axis E in a direction opposite to a direction toward the light-emitting portion 11 along the optical axis E. The third total reflecting portion 127 totally reflects, toward the light exiting portion 122, the narrow-angle light that enters inside the second light-guiding portion 150 through the third light incident portion 126.

The light exiting portion 122 includes a substantially flat surface. Light guided within the first light-guiding portion 140 and the second light-guiding portion 150 exits from the optical lens 12 through the light exiting portion 122.

An exiting-side recess portion 130 recessed from the light exiting portion 122 in the −Z direction is provided on the light exiting portion 122 side of the optical lens 12. The exiting-side recess portion 130 defines a recess having a substantially circular cross-sectional shape in a plane perpendicular to the optical axis E, and the center axis of the exiting-side recess portion 130 passing through the center of the substantially circular cross section substantially coincides with the optical axis E.

The exiting-side recess portion 130 is defined by a side surface portion 132 and a bottom surface portion closer to the light-emitting portion 11 than the side surface portion 132 with a boundary portion 133 located therebetween. The first total reflecting portion 131 is provided on the bottom surface portion of the exiting-side recess portion 130. The boundary portion 133 is an annular portion where the surface of the side surface portion 132 and the surface of the first total reflecting portion 131 meet.

The side surface portion 132 includes a curved surface substantially axisymmetric about the optical axis E and expands away from the optical axis E the in a direction opposite to a direction toward the light-emitting portion 11. The surface of the side surface portion 132 has irregularities with widths and heights approximately equal to or greater than the wavelength of the light emitted from the light-emitting portion 11 and randomly varying with location.

A portion of the wide-angle light from the light-emitting portion 11 may be reflected at the second light incident portion 124 without entering inside the first light-guiding portion 140 through the second light incident portion 124. The wide-angle light reflected at the second light incident portion 124 becomes stray light that does not contribute to illumination by the lighting device 1.

The irregularities provided on the side surface portion 132 are an example of a reflected light diffusion portion that diffuses the wide-angle light reflected at the second light incident portion 124 and an example of a reflected light attenuation portion that attenuates the light intensity of the wide-angle light reflected at the second light incident portion 124.

Figure 6:
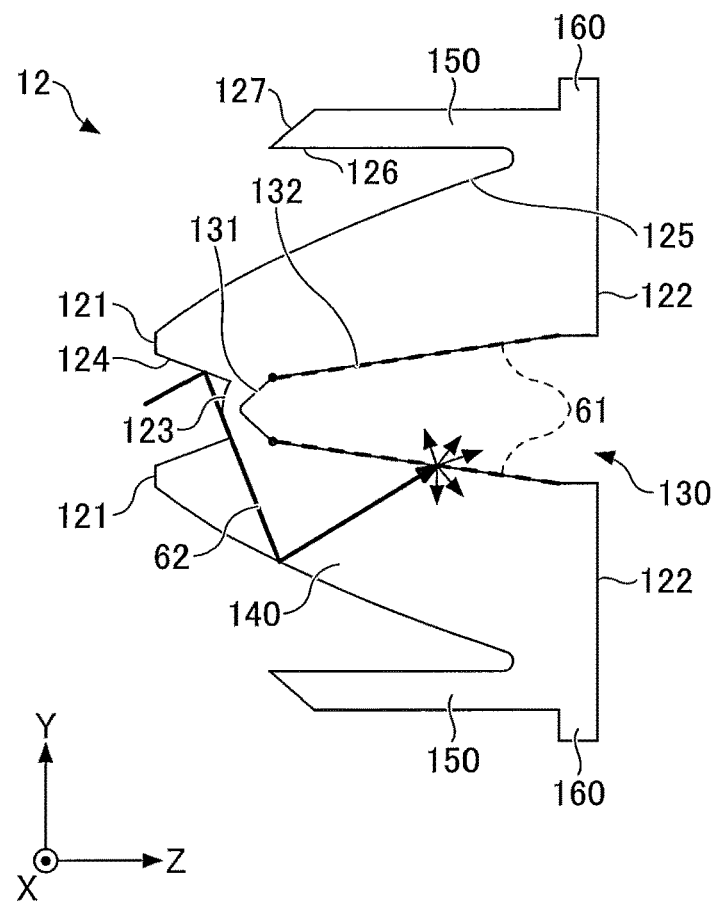
FIG. 6 is a schematic diagram illustrating an example of reduction in an amount of stray light due to irregularities.

FIG. 6 is a schematic diagram for describing an example of how the irregularities reduce the amount of stray light. As illustrated in FIG. 6, irregularities 61 are provided on the side surface portion 132 of the exiting-side recess portion 130. Also, stray light 62 indicates stray light caused by wide-angle light reflected at the second light incident portion 124. As illustrated in FIG. 6, the stray light 62 reaches the side surface portion 132 and is diffused by the irregularities 61 provided on the side surface portion 132, attenuating the light intensity.

FIG. 7 is a schematic diagram illustrating an example of a configuration of the irregularities provided on the side surface portion 132. As illustrated in FIG. 7, the irregularities 61 are irregularities with randomly varying widths 61a and heights 61b that vary with location. Additionally, the widths 61a and the heights 61b of the irregularities 61 are approximately equal to or greater than the wavelength of the light emitted from the light-emitting portion 11. As long as the widths 61a and the heights 61b are approximately equal to or greater than the wavelength of the light and randomly vary with location, the irregularities 61 may have discretionary shapes.

The irregularities 61 can be formed, for example, by forming an inverted shape of the irregularities 61 in a region corresponding to the side surface portion 132 on a mold used for the injection molding of the optical lens 12 and transferring this shape to the optical lens 12 when the injection molding is performed.

The irregularities 61 diffuse the light emitted from the light-emitting portion 11. Therefore, wide-angle light reflected at the second light incident portion 124 that reaches the side surface portion 132 of the exiting-side recess portion 130 is diffused by the irregularities 61, and the light intensity is attenuated. In this manner, the amount of stray light caused by wide-angle light reflected at the second light incident portion 124 can be reduced.

The irregularities provided on the lens end portion 121 also have a shape similar to the irregularities 61 in FIG. 7. By providing irregularities similar to the irregularities 61 on the lens end portion 121, an effect of attenuating the light intensity of the light incident on the optical lens 12 from the lens end portion 121 and reducing the amount of stray light can be achieved. A method similar to the method for forming the irregularities 61 on the side surface portion 132 can be used as the method for forming the irregularities on the lens end portion 121.

Example of Positional Relationships Between Portions of Optical Lens 12

Figure 8B:
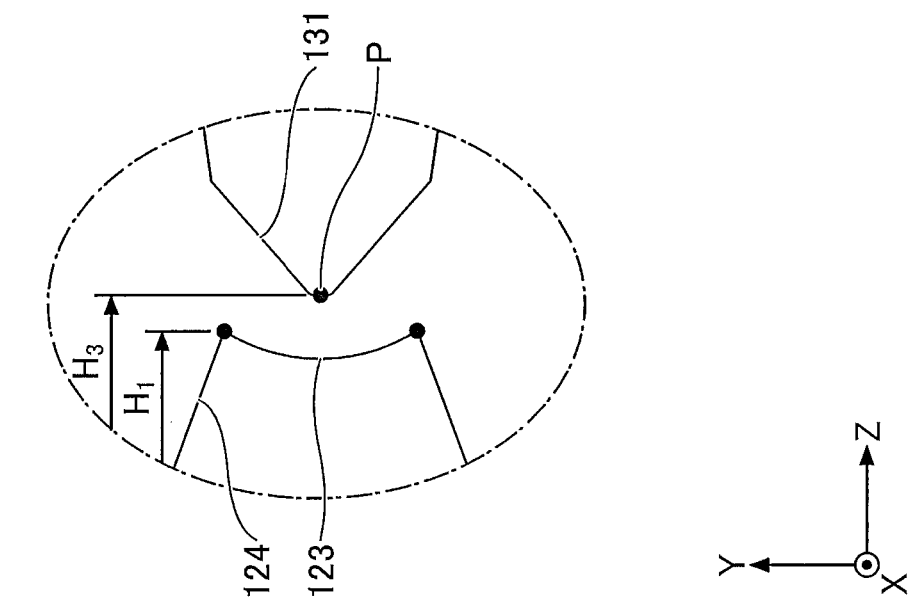
FIGS. 8A and 8B are schematic diagrams illustrating examples of the positional relationships between respective portions of an optical lens.
Figure 8A:
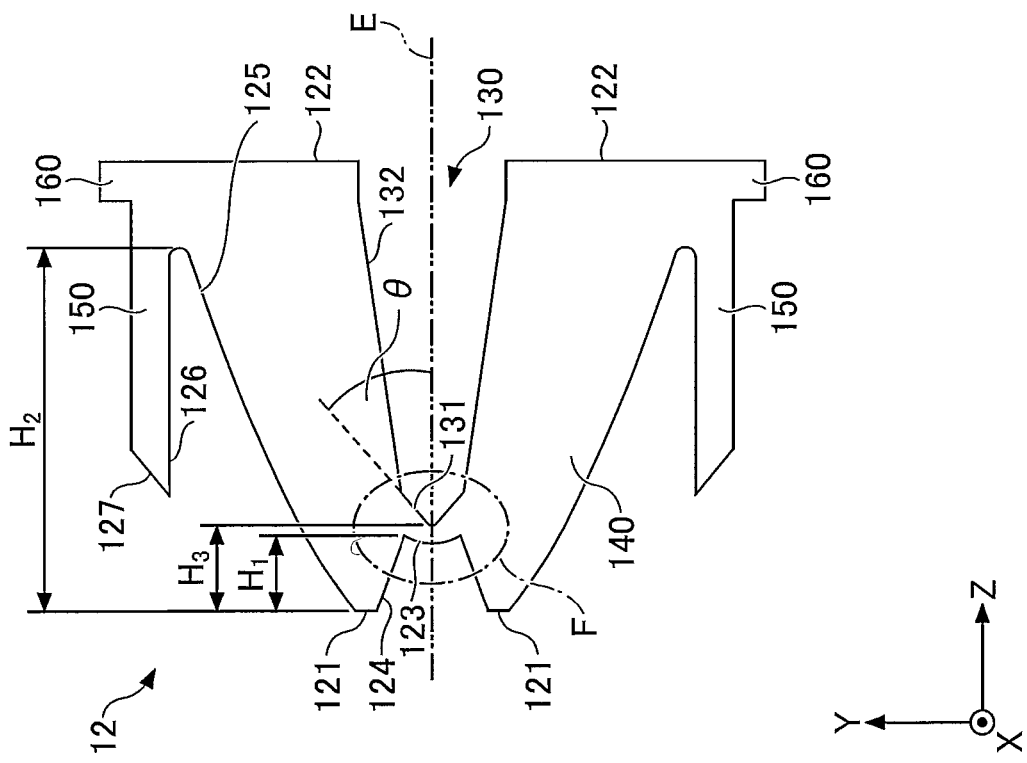

Next, the positional relationships between the portions of the optical lens 12 will be described in detail with reference to FIGS. 8A and 8B and FIGS. 9A and 9B. FIGS. 8A and 8B are schematic diagrams for describing an example of the relationship between the heights of the portions of the optical lens. FIG. 8A is a schematic cross-sectional view taken along the line VB-VB in FIG. 5A, and FIG. 8B is a schematic enlarged view of a region F in FIG. 8A. The term "height" refers to a distance in a direction along the optical axis E.

In FIGS. 8A and 8B, a height $H_1$ represents the distance in a direction along the optical axis E from the lens end portion 121 to the end portion of the first light incident portion 123 in a direction (Y direction) orthogonal to the optical axis E. A height $H_2$ represents the distance in a direction along the optical axis E from the lens end portion 121 to the end portion of the second total reflecting portion 125 in a direction (Y direction) orthogonal to the optical axis E. A height $H_3$ represents the distance in a direction along the optical axis E from the lens end portion 121 to an intersection point P where the optical axis E and the first total reflecting portion 131 intersect.

In the present embodiment, the heights $H_1$, $H_2$, and $H_3$ satisfy Formula (1) below.

$$H_1 \leq H_3 \leq H_2 \tag{1}$$

Figure 9A:
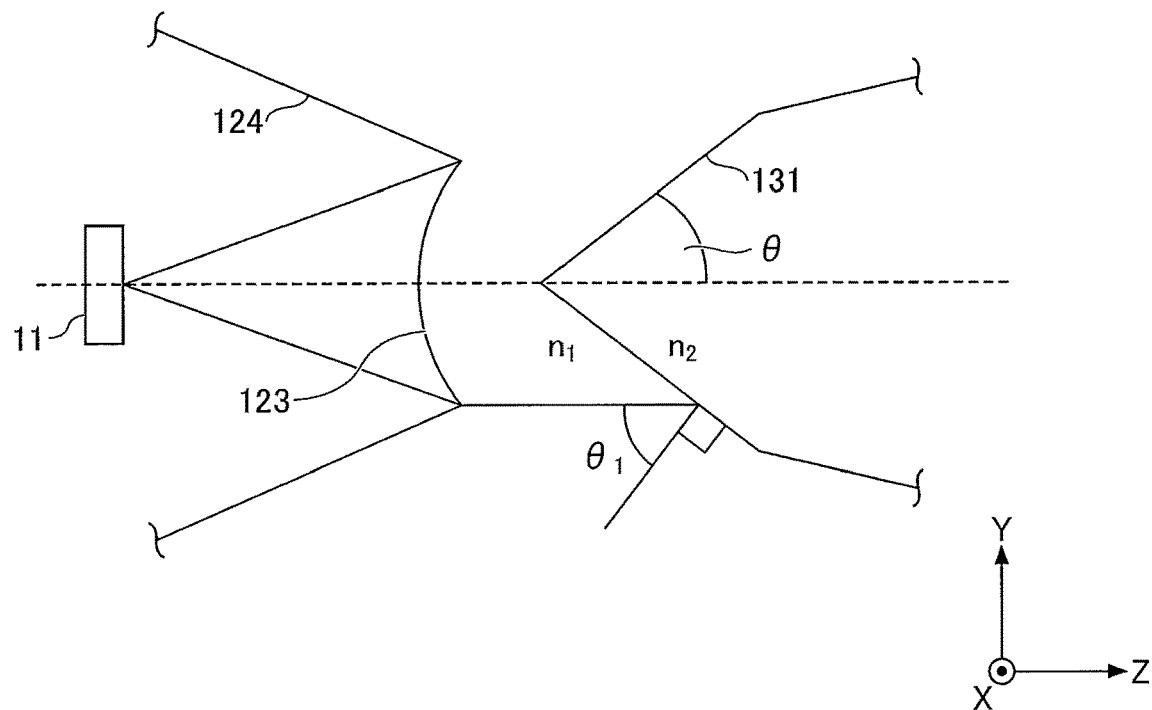
FIGS. 9A and 9B are schematic diagrams illustrating a first total reflecting portion.
Figure 9B:
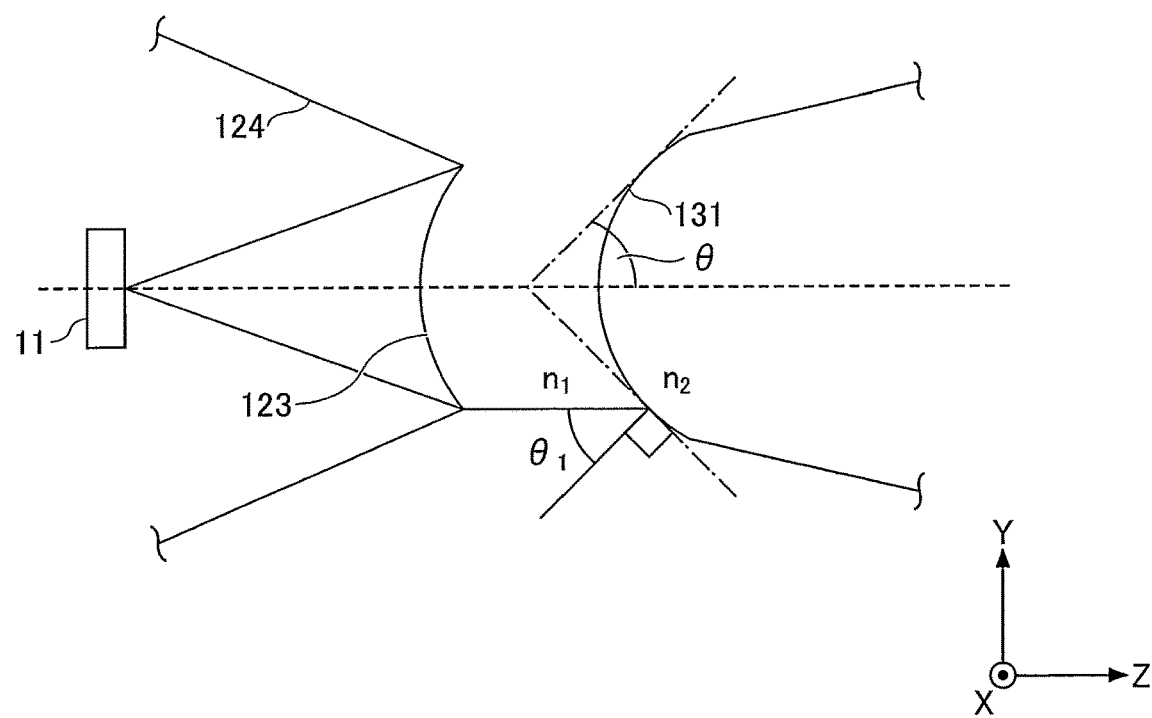

FIGS. 9A and 9B are schematic diagrams illustrating first total reflecting portion 131. FIG. 9A is a schematic diagram illustrating an example in which the first total reflecting portion 131 is a conical surface, and FIG. 9B is a schematic diagram illustrating an example in which the first total reflecting portion 131 is a curved surface.

In FIGS. 9A and 9B, an angle θ represents the angle formed by the optical axis E and the first total reflecting portion 131 in a plane that includes the optical axis E. An angle $θ_1$ represents the angle formed by an axis along the direction in which the incident narrow-angle light from the first light incident portion 123 is incident on the first total reflecting portion 131 and an axis orthogonal to the first total reflecting portion 131.

Also, a refractive index $n_1$ represents the refractive index of the optical lens 12, and a refractive index $n_2$ represents the refractive index of the medium opposite to the optical lens 12 with respect to the first total reflecting portion 131 as an interface therebetween. For example, in a case in which the material of the optical lens 12 is acrylic, the refractive index $n_1$ is from 1.49 to 1.53. In addition, in a case in which the medium opposite to the optical lens 12 with respect to the first total reflecting portion 131 as an interface therebetween is air, the refractive index $n_2$ is approximately 1.

In the present embodiment, the angle θ satisfies Formula (2) below.

$$\sin(\pi/2 - \theta) \geq n_2/n_1 \tag{2}$$

where π represents pi.

By satisfying Formula (1) and Formula (2), the light that enters inside the first light-guiding portion 140 from the first light incident portion 123 can be efficiently totally reflected at the first total reflecting portion 131, and a decrease in the illumination quality caused by the light source pattern of the light-emitting portion 11 being reflected in the irradiation image can be reduced.

Example of Light Guidance by Optical Lens 12

Figure 10:
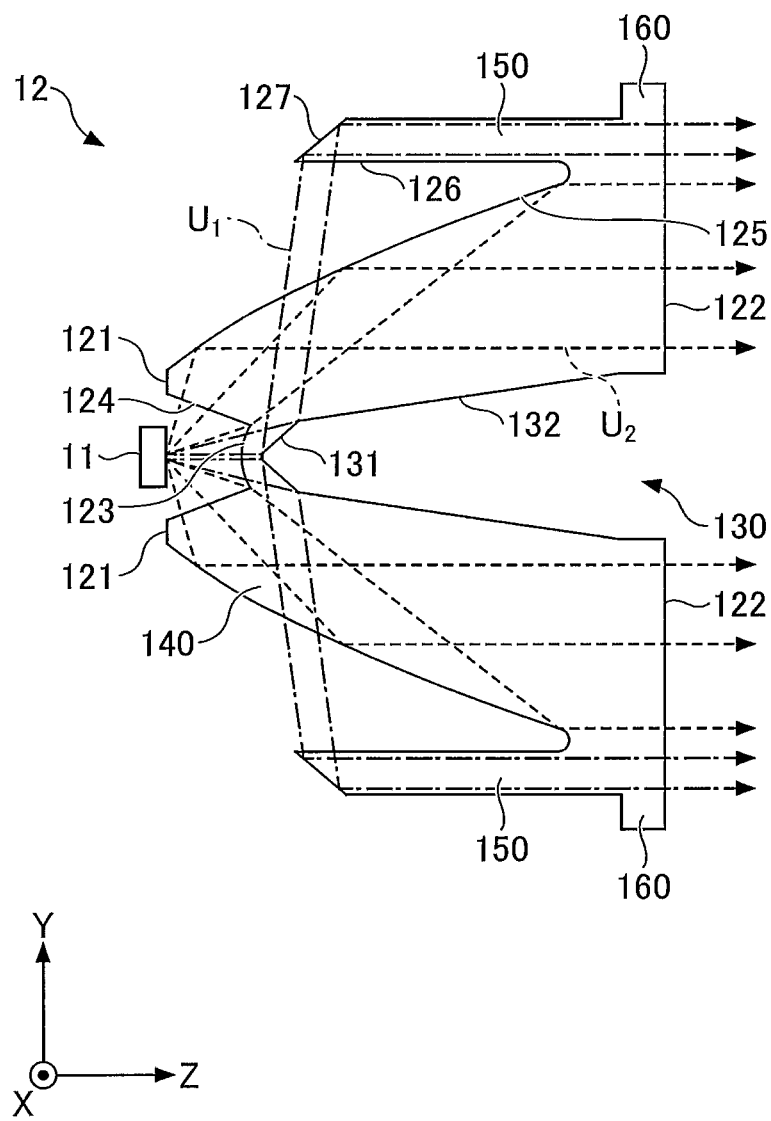
FIG. 10 is a schematic diagram illustrating an example of guiding light by an optical lens according to one embodiment.

Next, an example of light guidance by the optical lens 12 will be described with reference to FIG. 10. FIG. 10 is a schematic diagram for describing an example of how the light is guided by the optical lens 12.

Narrow-angle light $U_1$ illustrated by the dot-dash line in FIG. 10 represents narrow-angle light of the light emitted from the light-emitting portion 11. Also, wide-angle light $U_2$ illustrated by the dashed line in FIG. 10 represents wide-angle light of the light emitted from the light-emitting portion 11.

As illustrated in FIG. 10, the narrow-angle light $U_1$ enters inside the first light-guiding portion 140 through the first light incident portion 123 and is guided inside the first light-guiding portion 140. Subsequently, the narrow-angle light $U_1$ reaches the first total reflecting portion 131 provided on the +Z direction side of the first light incident portion 123 and is totally reflected at the first total reflecting portion 131.

The narrow-angle light $U_1$ totally reflected at the first total reflecting portion 131 is guided inside the first light-guiding portion 140, reaches the second total reflecting portion 125, and passes through the second total reflecting portion 125. Subsequently, the narrow-angle light $U_1$ enters inside the second light-guiding portion 150 through the third light incident portion 126. The narrow-angle light $U_1$ that entered inside the second light-guiding portion 150 is totally reflected toward the light exiting portion 122 by the third total reflecting portion 127, guided inside the second light-guiding portion 150, and then exits from the optical lens 12 through the light exiting portion 122.

On the other hand, the wide-angle light $U_2$ enters inside the first light-guiding portion 140 through the second light incident portion 124 and is guided inside the first light-guiding portion 140. Subsequently, the wide-angle light $U_2$ reaches the second total reflecting portion 125 and is totally reflected at the second total reflecting portion 125.

The wide-angle light $U_2$ totally reflected at the second total reflecting portion 125 is guided inside the first light-guiding portion 140, and then exits from the optical lens 12 through the light exiting portion 122.

In this manner, the optical lens 12 can guide light emitted from the light-emitting portion 11 and can allow collimated (parallel) light to exit.

Function of Optical Lens 12

The function of the optical lens 12 will be described.

Example of Light Guiding by Optical Lens 12X According to Comparative Example

An optical lens 12X according to a comparative example will be described prior to explaining the function of the optical lens 12.

FIG. 11 is a schematic diagram for describing an example of how the light is guided by the optical lens 12X. For convenience to facilitate comparison with the optical lens 12 according to the embodiment, components corresponding to the components of the optical lens 12 are designated by the same component names.

As illustrated in FIG. 11, the optical lens 12X includes a first light incident portion 123X, a second light incident portion 124X, a total reflecting portion 125X, and a light exiting portion 122X.

The first light incident portion 123X is provided at a position where narrow-angle light $UX_1$ of light emitted from a light-emitting portion 11X can be incident. The narrow-angle light $UX_1$ emitted from the light-emitting portion 11X enters inside the optical lens 12X through the first light incident portion 123X.

The narrow-angle light $UX_1$ is guided inside the optical lens 12X, and then exits from the optical lens 12X through the light exiting portion 122X.

The second light incident portion 124X is provided at a position where wide-angle light $UX_2$ of light emitted from the light-emitting portion 11X can be incident. The wide-angle light $UX_2$ emitted from the light-emitting portion 11X enters inside the optical lens 12X through the second light incident portion 124X.

The wide-angle light $UX_2$ is guided inside the optical lens 12X, reaches the total reflecting portion 125X, and is totally reflected at the total reflecting portion 125X. The light totally reflected at the total reflecting portion 125X is guided inside the optical lens 12X, and then exits from the optical lens 12X through the light exiting portion 122X.

In this manner, the optical lens 12X can guide light emitted from the light-emitting portion 11X and can allow collimated (parallel) light to exit.

Example of Light Emission by Lighting Device 1X According to Comparative Example Next, FIGS. 12A to 12C are diagrams for describing examples of light emission by a lighting device 1X including the optical lens 12X according to the comparative example. FIGS. 12A to 12C illustrate captured images of light emitted from the lighting device 1X, with the black region corresponding to the background, and the white region corresponding to light. The higher the brightness of the white region, the brighter the light is (higher brightness). FIG. 12A is a diagram captured from a side in a direction that intersects the light emission direction, FIG. 12B is an enlarged view of a region C in FIG. 12A, and FIG. 12C is a diagram captured from a side in the light emission direction.

As illustrated in FIGS. 12A and 12B, in the light emitted from the lighting device 1X, near the lighting device 1X, a high-brightness region 91 with high brightness is generated in a band-like shape. The light in the high-brightness region 91 is unwanted stray light that does not contribute to the light emitted from the lighting device 1X and is a factor in the decrease in the quality of the emitted light.

As illustrated in FIG. 12C, when a pattern 90 of the light emitted from the lighting device 1X is viewed from the irradiation direction side (front surface), the circular shape is deformed and is slightly rectangular. The spread angle of the pattern 90 in a horizontal direction 92 and the spread angle of the pattern 90 in a diagonal direction 93 are as indicated in Table 1, with the difference in spread angle due to direction being large.

TABLE 1

| Half beam angle | Horizontal | 3.6° |
|---|---|---|
| | Diagonal | 4.0° |

It is thought that the light emission pattern of the light-emitting portion 11X being projected by the optical lens 12X or the like is a factor in making the difference in spread angle based on direction large in the pattern 90. The term "light emission pattern of the light-emitting portion" refers to a pattern along the light-emitting portion shape such as the substantially rectangular shape of the phosphor portion 112 in a plane orthogonal to the optical axis E (see FIG. 2). In a case in which the pattern 90 has a rectangular shape, the illuminance level is non-uniform and the quality of the emitted light decreases.

Example of Light Emission by Lighting Device 1 According to Embodiment

Figure 13A:
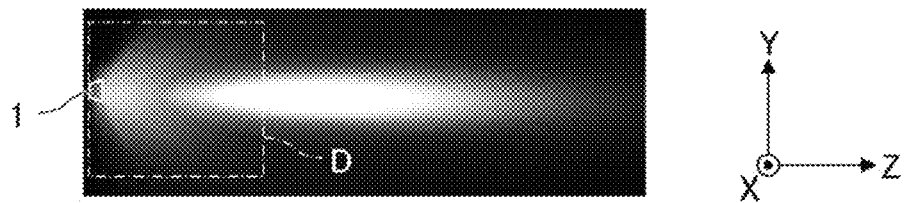
FIGS. 13A to 13C are diagrams schematically illustrating examples of light emission from a lighting device according to one embodiment.
Figure 13B:
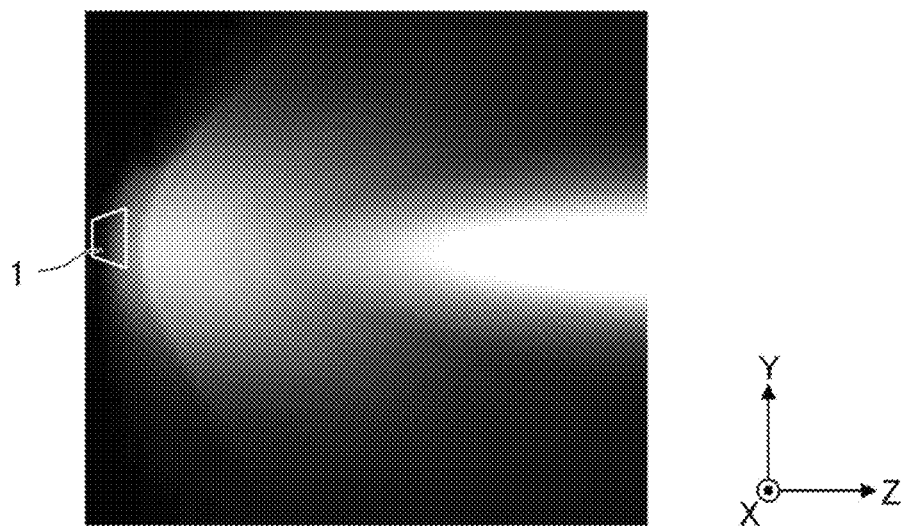
Figure 13C:
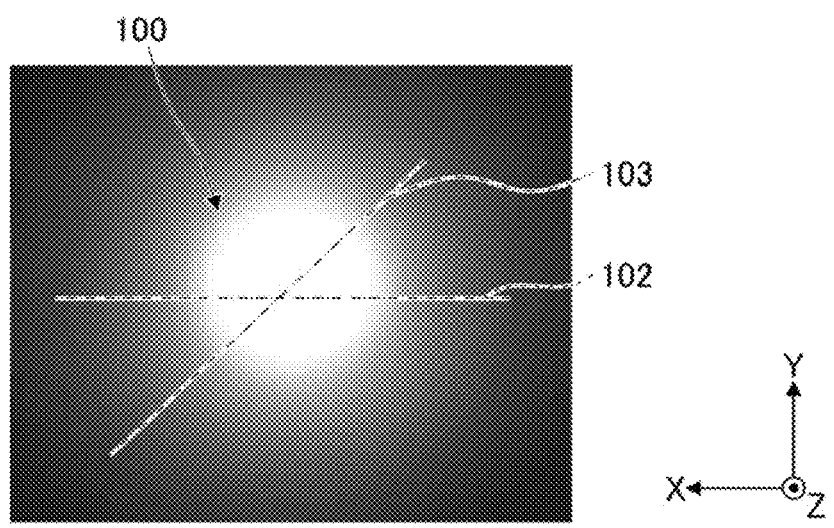

Next, FIGS. 13A to 13C are diagrams for describing examples of light emission by a lighting device 1 according to the embodiment. FIG. 13A is a diagram captured from a side in a direction that intersects the light emission direction, FIG. 13B is an enlarged view of a region D in FIG. 13A, and FIG. 13C is a diagram captured from a side in the light emission direction. The views of FIGS. 13A to 13C are similar to those of FIGS. 12A to 12C.

As illustrated in FIGS. 13A and 13B, in the light emitted from the lighting device 1, a high brightness region such as that observed in the lighting device 1X is not produced.

As illustrated in FIG. 13C, when a pattern 100 of the light emitted from the lighting device 1 is viewed from the irradiation direction side (front surface), a substantially circular shape is obtained. The spread angle of the pattern 100 in a horizontal direction 102 and the spread angle of the pattern 100 in a diagonal direction 103 are as indicated in Table 2, with the difference in spread angle with direction being smaller than that in the comparative example of Table 1.

TABLE 2

| Half beam angle | Horizontal | 3.1° |
|---|---|---|
| | Diagonal | 3.2° |

In this manner, in the lighting device 1, the amount of stray light with high brightness can be reduced, and a pattern 100 having a substantially circular shape can be obtained. Accordingly, the quality of the emitted light is improved.

Examples of Patterns of Light Emitted from Lighting Device 1

Next, patterns of light emitted from the lighting device 1 will be described with reference to FIG. 14. FIG. 14 is a diagram illustrating examples of patterns of emitted light at different distances from the lighting device. The top row of the table in FIG. 14 illustrates the distance from the lighting device; where the closer to the left side of the paper, the closer to the lighting device, and the closer to the right side of the paper, the further away from the lighting device. In the examples illustrated in FIG. 14, the farthest distance is 5 m.

In addition, the second row of the table illustrates the patterns of light emitted from the lighting device 1X according to the comparative example, and the third row of the table illustrates the patterns of light emitted from the lighting device 1 according to the present embodiment. The patterns of emitted light are for different distances as seen from the light emission direction side (+Z direction side).

In a pattern 201X at the shortest distance from the lighting device 1X, the pattern caused by the narrow-angle light $UX_1$ and the pattern caused by the wide-angle light $UX_2$ are separated. As illustrated by patterns 202X and 203X, as the distance increases from the lighting device 1X, the two come closer together, and at a position 5 m from the lighting device 1X, the two merge into a single spot-like pattern 204X.

For example, in the pattern 203X, the pattern caused by the narrow-angle light $UX_1$ is substantially collimated light with a rectangular pattern while still having the aspect ratio of the light emission pattern of the light-emitting portion 11X. In other words, the light emission pattern of the light-emitting portion 11X is projected by the narrow-angle light $UX_1$.

As a result of the pattern caused by the wide-angle light $UX_2$ having a substantially circular shape and the pattern caused by the narrow-angle light $UX_1$ with a rectangular shape overlapping one another, even at the position 5 m from the lighting device 1X, the pattern 204X with a rectangular shape including the light emission pattern of the light-emitting portion 11X is obtained.

On the other hand, in a pattern 201 at the shortest distance from the lighting device 1 according to the embodiment, the pattern caused by the narrow-angle light $U_1$ can be observed on the outer side of the pattern caused by the wide-angle light $U_2$. The center portion of the pattern 201 is dark because no light is present.

As in patterns 202 and 203 at longer distances from the lighting device 1, as the pattern caused by the narrow-angle light $U_1$ and the pattern caused by the wide-angle light $U_2$ approach one another, the center dark portion decreases in size. At a position separated from the lighting device 1 by 5 m, the pattern caused by the narrow-angle light $U_1$ and the pattern caused by the wide-angle light $U_2$ merge into a single spot-like pattern 204.

The narrow-angle light $U_1$ incident at or near the optical axis E (in a near-axis region) of the optical lens 12 is guided by the second light-guiding portion 150 on the outer side of the optical lens 12. Thus, an effect of forming an image in the near-axis region is reduced, and projection of the light emission pattern of the light-emitting portion 11 can be hindered. As a result, at a position separated from the lighting device 1 by 5 m, the pattern 204 having a substantially circular shape can be obtained, resulting from hindering of projection of the light emission pattern of the light-emitting portion 11.

In the present embodiment, an example of a configuration in which the narrow-angle light $U_1$ is guided by the second light-guiding portion 150 on the outer side of the optical lens 12 is illustrated, but other configuration may be employed. For example, in a configuration in which the optical lens 12 does not include the second light-guiding portion 150, the narrow-angle light $U_1$ is not contained in the light exited from the optical lens 12. Thus, the pattern 204 having a substantially circular shape can be obtained, resulting from hindering of projection of the light emission pattern of the light-emitting portion 11 can be obtained.

Effects of Optical Lens 12

Next, the effects of the optical lens 12 will be described.

A known optical lens includes a reflecting portion that reflects light incident from a light source and a light exiting portion through which light having entered from a light source exits. However, with a known configuration, light incident near the optical axis of the optical lens is guided. Thus, the light emission pattern of the light source may be projected, and the illuminance level of the irradiating light may be uneven. Stray light may also occur due to the light incident on the optical lens reflecting at the surface of the optical lens, and the quality of the emitted light may decrease.

Also, with a known configuration in which, with an optical lens that includes a reflecting portion that reflects light incident from a light source and a light exiting portion through which light having entered from the light source exits, a portion of light traveling toward an opposing region opposing a light source exits through a peripheral portion that is located outward from the opposing region and that does not oppose the light source (see Patent Document 1). However, in this configuration, in order to ensure an optical path that avoids the reflecting portion so that light exits through a peripheral region not opposing the light source, the entire length of the optical lens in a direction along the center axis (optical axis) of the optical lens is increased.

In the present embodiment, the optical lens 12 includes the first light incident portion 123 where narrow-angle light from the light-emitting portion 11 (the light source) is incident and the second light incident portion 124 where the wide-angle light from the light-emitting portion 11 is incident. The optical lens 12 includes the first total reflecting portion 131 that totally reflects the incident light from the first light incident portion 123, the second total reflecting portion 125 that totally reflects the incident light from the second light incident portion 124, and the light exiting portion 122 through which the light totally reflected at the second total reflecting portion 125 exits, with the second total reflecting portion 125 allowing the light totally reflected at the first total reflecting portion 131 to pass through.

For example, the first total reflecting portion 131 includes a surface such as a conical surface that expands away from the optical axis E in a direction opposite to a direction toward the light-emitting portion 11 along the optical axis E.

The narrow-angle light $U_1$ incident at or near the optical axis E (lens center axis) of the optical lens 12 is totally reflected at the first total reflecting portion 131 before passing through the second total reflecting portion 125 and thus is not contained in the light exited from the optical lens 12. As a result, projection of the light emission pattern of the light-emitting portion 11 can be hindered, and a uniform emitted light having a substantially circular shape can be obtained.

In addition, the narrow-angle light $U_1$ totally reflected at the first total reflecting portion 131 passes through the second total reflecting portion 125, and thus an optical path avoiding the second total reflecting portion 125 does not need to be ensured. Accordingly, the entire length of the optical lens 12 in the direction along the optical axis E can be shortened, and an increase in the size of the optical lens 12 can be hindered.

In addition, because the first total reflecting portion 131 totally reflects the narrow-angle light $U_1$ without allowing it to pass through, stray light caused by the narrow-angle light $U_1$ passing through the first total reflecting portion 131 can be reduced.

In this manner, with the present embodiment, the quality of the emitted light can be improved, and an increase in the size of the optical lens 12 can be hindered.

Furthermore, in the present embodiment, the optical lens 12 further includes the third light incident portion 126 where light that passes through the second total reflecting portion 125 is incident and the third total reflecting portion 127 that totally reflects the incident light from the third light incident portion 126. Light that is totally reflected at the third total reflecting portion 127 exits through the light exiting portion 122.

By the first total reflecting portion 131 totally reflecting the narrow-angle light an effect of an image forming in the near-axis region of the optical lens 12 can be reduced, and projection of the light emission pattern of the light-emitting portion 11 can be hindered. Furthermore, the light totally reflected at the first total reflecting portion 131 is emitted from the light exiting portion 122 through the third light incident portion 126 and the third total reflecting portion 127 and can thus be included in the light exiting from the optical lens 12. Accordingly, the use efficiency of the light from the light-emitting portion 11 can be increased.

In the present embodiment, the optical lens 12 includes the exiting-side recess portion 130 recessed from the light exiting portion 122, and the exiting-side recess portion 130 includes the side surface portion 132 and a bottom surface portion located closer to the light-emitting portion 11 than the side surface portion 132, with a boundary portion 133 located therebetween. The first total reflecting portion 131 is provided on the bottom surface portion of the exiting-side recess portion 130.

Accordingly, the range $h_1$ of the first total reflecting portion 131 along the optical axis E can be included within the range $h_2$ of the second total reflecting portion 125 along the optical axis E, and the entire length of the optical lens 12 in the direction along the optical axis E can be shortened, and an increase in the size of the optical lens 12 can be hindered.

In the present embodiment, the optical lens 12 further includes a reflected light attenuation portion that attenuates the light intensity of the wide-angle light $U_2$ reflected at the second light incident portion 124. For example, the optical lens 12 includes the exiting-side recess portion 130 recessed from the light exiting portion 122, the exiting-side recess portion 130 includes the side surface portion 132 and a bottom surface portion provided on the light-emitting portion 11 side of the side surface portion 132, and the reflected light attenuation portion includes the irregularities 61 (reflected light diffusion portion) that diffuses the light reflected at the second light incident portion 124 on the side surface portion 132.

The wide-angle light reflected at the second light incident portion 124 that reaches the side surface portion 132 of the exiting-side recess portion 130 is diffused by the irregularities 61, and the light intensity is attenuated. In this manner, the amount of stray light caused by the wide-angle light $U_2$ reflected at the second light incident portion 124 is reduced. For example, the amount of stray light such as a high brightness region or the like produced in a band-like shape at or near the lighting device 1 can be reduced, and a decrease in the quality of the emitted light caused by stray light can be reduced.

Also, in the present embodiment, the optical lens 12 is provided, on the lens end portion 121, with the irregularities 61 (incident light attenuation portion) for attenuating the light intensity of the light incident on the optical lens 12. Accordingly, the light that enters inside the optical lens 12 through the lens end portion 121 is diffused, and the light intensity is attenuated, allowing the production of stray light to be reduced.

Also, in the present embodiment, Formulas (1) and (2) are satisfied. Accordingly, the light that enters inside the first light-guiding portion 140 from the first light incident portion 123 can be efficiently totally reflected at the first total reflecting portion 131, and a decrease in the illumination quality caused by the light source pattern of the light-emitting portion 11 being reflected in the irradiation image can be reduced.

Certain embodiments and the like have been described in detail above. The present disclosure is not limited to the above-described embodiments and the like, various modifications and substitutions can be made to the above-described embodiments and the like without departing from the scope described in the claims.

Incoherent light is used as an example of the light emitted from the light-emitting portion 11; however, the incoherent light may be light emitted from a light-emitting diode (LED), a filament, or the like.

Also, modifications may be made to the optical lens. Various modification examples of the optical lens are described below.

Modification Examples

Figure 15B:
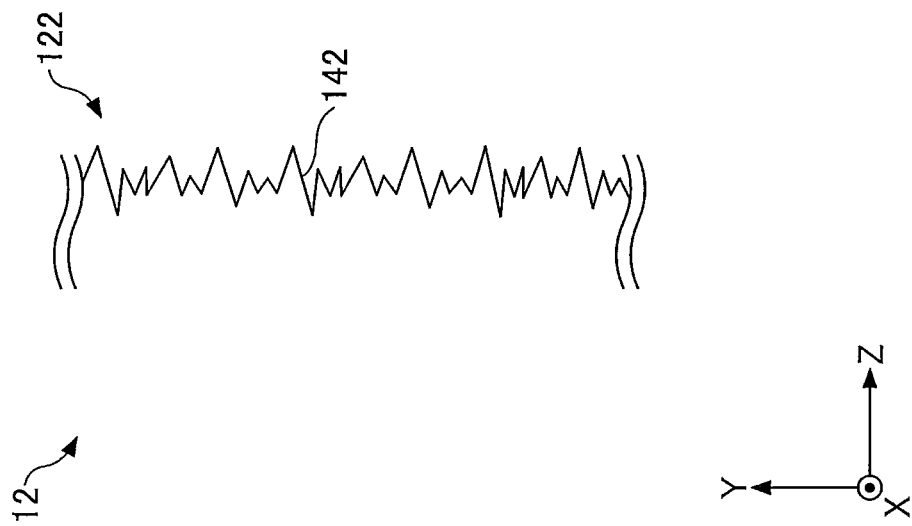
FIGS. 15A and 15B are schematic diagrams illustrating examples of the configuration of an exiting-light diffusion portion.
Figure 15A:
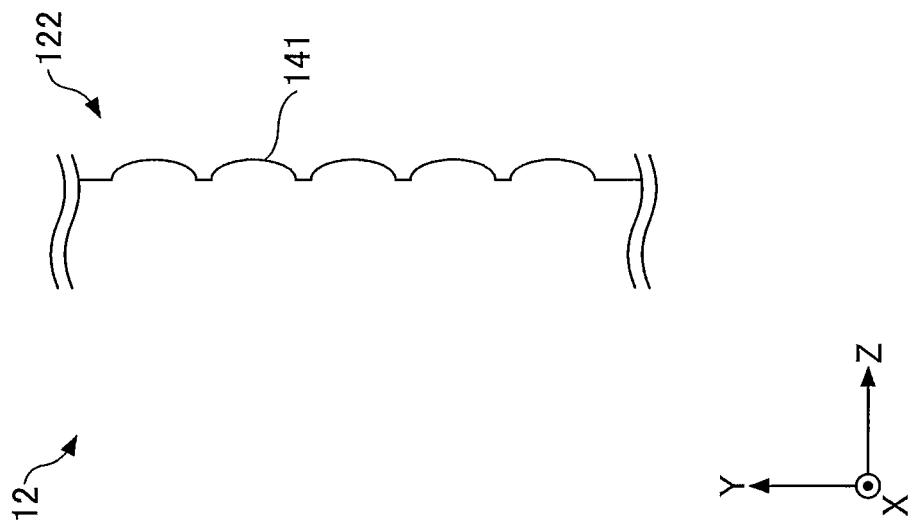

For example, the optical lens 12 may be provided, on the light exiting portion 122, with an exiting-light diffusion portion that diffuses the light exiting through the light exiting portion 122. FIGS. 15A and 15B are schematic diagrams illustrating examples of the configuration of an exiting-light diffusion portion. FIG. 15A is a schematic diagram illustrating a fly eye lens 141, and FIG. 15B is a schematic diagram illustrating a roughened surface 142. The fly eye lens 141 and the roughened surface 142 are examples of an exiting-light diffusion portion.

To form the fly eye lens 141 and the roughened surface 142 on the optical lens 12, a shape inverted from the shape of the fly eye lens 141 and a shape inverted from the shape of the roughened surface 142 can be formed in a region of a mold used for injection molding of the optical lens 12 corresponding to the light exiting portion 122, and these inverted shapes can be transferred in the injection molding.

Alternatively, the fly eye lens 141 or the roughened surface 142 can be provided on the optical lens 12 by attaching a manufactured member other than the optical lens 12 on which the fly eye lens 141 or the roughened surface 142 is formed to the light exiting portion 122 of the optical lens 12. Additionally, the roughened surface 142 can be formed by performing sand blasting or similar processing on the light exiting portion 122 after the optical lens 12 is formed via injection molding.

Diffusing the light exiting through the light exiting portion 122 by the exiting-light diffusion portion allows for dispersing the light exiting the optical lens 12, allowing the light to be emitted in a larger area. Further, the directivity of the emitted light can be reduced, so that light with reduced glare can be emitted.

Figure 16:
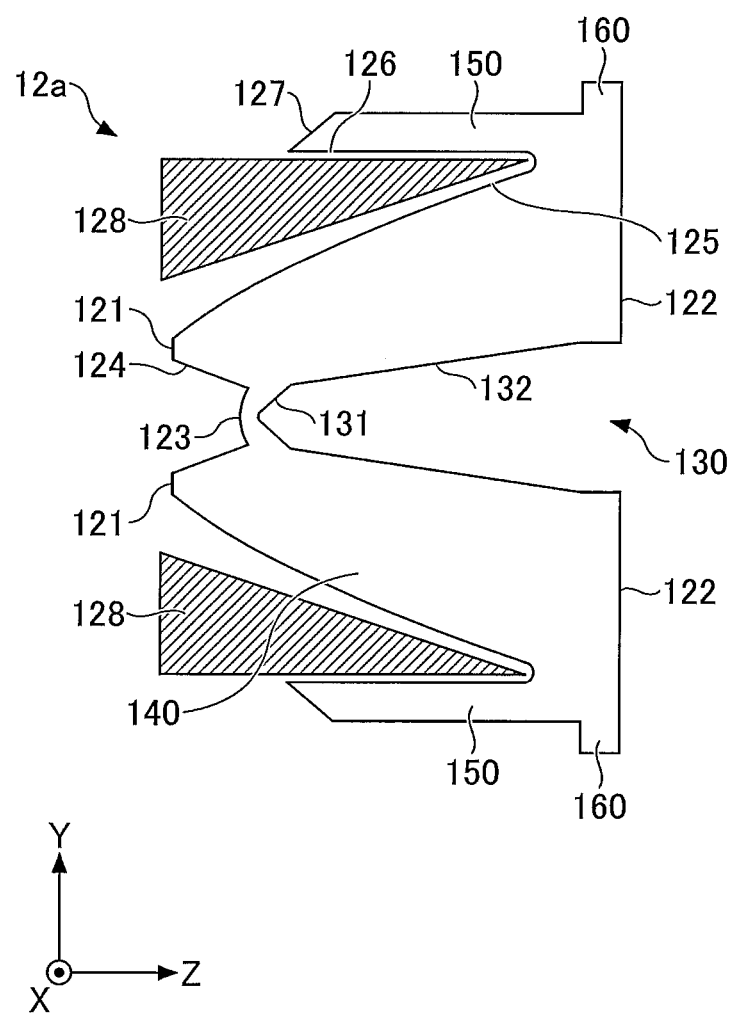
FIG. 16 is a schematic diagram illustrating an example of the configuration of a light shielding member.

Next, FIG. 16 is a schematic diagram for describing an example of the configuration of an optical lens 12a according to a first modification example. As illustrated in FIG. 16, the optical lens 12a includes a light shielding member 128.

The light shielding member 128 is an example of a transmitted light shielding portion that blocks the narrow-angle light U₁ that is totally reflected at the first total reflecting portion 131 and passes through the second total reflecting portion 125. The light shielding member 128 is a member that includes an acrylic resin or the like having light-shielding properties with respect to the light emitted from the light-emitting portion 11, for example.

The light shielding member 128 is disposed at a position capable of blocking the narrow-angle light U₁ that has passed through the second total reflecting portion 125 and is fixed to a lens barrel or the like that holds the optical lens 12a. The shape of the light shielding member 128 is not particularly limited as long as the light shielding member 128 can be disposed at a position where the narrow-angle light U₁ that has passed through the second total reflecting portion 125 can be blocked.

In a case in which the light shielding member 128 has light absorbability, the amount of stray light caused by light reflected at the light shielding member 128 can be reduced, which is more preferable. In addition, shielding from the light emitted from the light-emitting portion 11 for a long period of time may result in heat generation or breakage of the light shielding member 128. Thus, using the light shielding member 128 having a heat shielding function is further preferred because such heat generation or breakage can be prevented.

In FIG. 16, a configuration in which the optical lens 12a includes the second light-guiding portion 150 is illustrated. However, in a case in which the light shielding member 128 is provided, the optical lens 12a need not be provided with the second light-guiding portion 150. In a configuration in which the optical lens 12a is not provided with the second light-guiding portion 150, unless the light shielding member 128 is provided, the narrow-angle light U₁ that has passed through the second total reflecting portion 125 is incident on the lens barrel or the like holding the optical lens 12a, which may result in generation of heat from the lens barrel or the like. Providing the light shielding member 128 also allows for obtaining the effect of preventing such heat generation.

Figure 17:
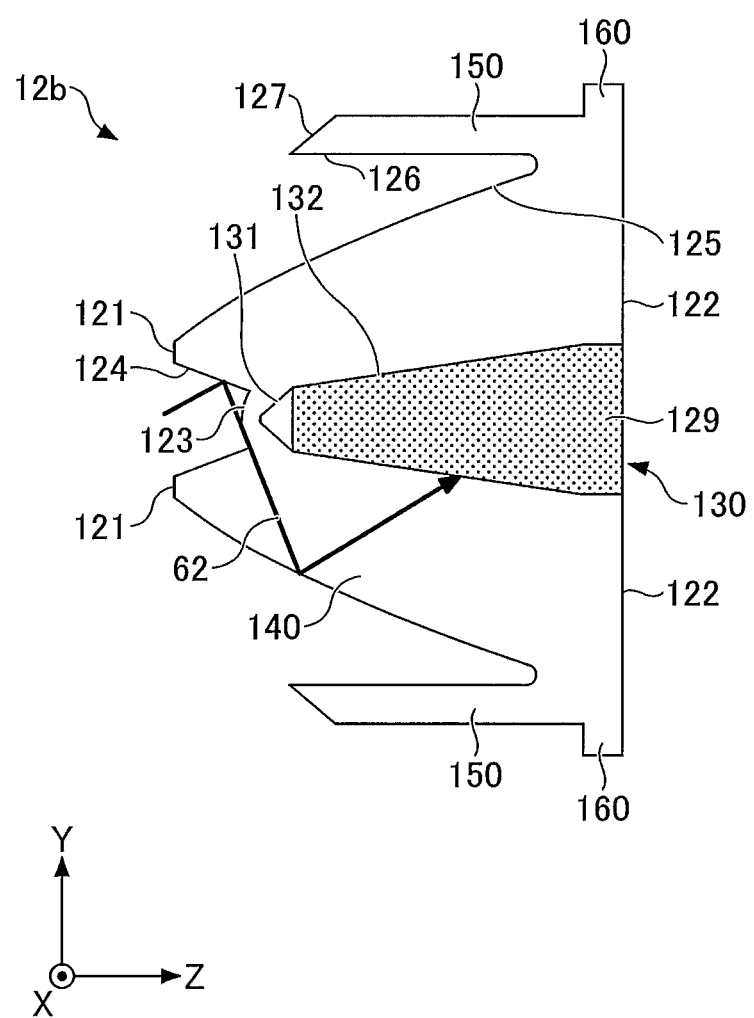
FIG. 17 is a schematic diagram illustrating an example of the configuration of a light absorbing member.

Next, FIG. 17 is a schematic diagram for describing an example of the configuration of an optical lens 12b according to a second modification example. As illustrated in FIG. 17, the optical lens 12b includes a light absorbing member 129.

The light absorbing member 129 is an example of a light absorbing portion that absorbs the wide-angle light U₂ reflected at the second light incident portion 124. The light absorbing member 129 is an example of a reflected light attenuation portion that attenuates the light intensity of the stray light 62 caused by the wide-angle light U₂ reflected at the second light incident portion 124.

The light absorbing member 129 is provided inside the exiting-side recess portion 130. The light absorbing member 129 absorbs the stray light 62 that has been reflected at the second light incident portion 124 and passed through the side surface portion 132 and/or the first total reflecting portion 131 of the exiting-side recess portion 130. In this manner, the amount of the stray light 62 caused by the wide-angle light U₂ reflected at the second light incident portion 124 can be reduced.

The light absorbing member 129 includes a member of a black resin or the like having absorbability with respect to the light emitted from the light-emitting portion 11, for example. The light absorbing member 129 can be provided fixed on the side surface portion 132. Alternatively, the light absorbing member 129 may be provided by attaching a film having absorbability with respect to the light emitted from the light-emitting portion 11 on the side surface portion 132.

The irregularities (reflected light diffusion portion) formed on the side surface portion 132 and the light absorbing member 129 can be combined as appropriate. For example, the light absorbing member 129 can be provided after the irregularities with light diffusing properties are provided on the surface of the side surface portion 132, with the combination being able to further attenuate the light intensity of the stray light 62. Alternatively, the light absorbing member 129 may be provided instead of providing the irregularities with light diffusing properties on the surface of the side surface portion 132.

What is claimed is:

1. An optical lens, comprising:
   a first light incident portion on which a narrow-angle light from a light source is incident;
   a second light incident portion on which a wide-angle light from the light source is incident;
   a first total reflecting portion configured to totally reflect the light incident on the first light incident portion;
   a second total reflecting portion configured to totally reflect the light incident on the second light incident portion; and
   a light exiting portion through which light totally reflected at the second total reflecting portion exits, wherein
   the second total reflecting portion is configured to transmit light totally reflected at the first total reflecting portion such that the light totally reflected at the first total reflecting portion toward an outer periphery of the optical lens passes through the second total reflecting portion in a direction toward the outer periphery of the optical lens.

2. The optical lens according to claim 1, wherein
   the first total reflecting portion includes a surface that expands away from the center axis of the optical lens in a direction opposite to a direction toward the light source along the lens center axis of the optical lens.

3. The optical lens according to claim 1, further comprising:
   a third light incident portion on which light that has been transmitted through the second total reflecting portion is incident; and
   a third total reflecting portion configured to totally reflect the light incident on the third light incident portion, wherein
   light totally reflected at the third total reflecting portion exits the optical lens through the light exiting portion.

4. The optical lens according to claim 1, further comprising:
   a transmitted light shielding portion that shields the light that has been transmitted through the second total reflecting portion.

5. The optical lens according to claim 1, further comprising:
   an exiting-side recess portion recessed from the light exiting portion, wherein
   the exiting-side recess portion includes a lateral surface portion, a boundary portion, and a bottom surface portion located closer to the light source than the lateral surface portion with the boundary portion located between the lateral surface portion and the bottom surface portion; and
   the first total reflecting portion is provided in the bottom surface portion.

6. The optical lens according to claim 1, wherein a region of the first total reflecting portion along a lens center axis of the optical lens is included within a region of the second total reflecting portion along the lens center axis of the optical lens.

7. The optical lens according to claim 1, further comprising:
a reflected light attenuation portion configured to attenuate light intensity of light reflected at the second light incident portion.

8. The optical lens according to claim 1, wherein the light exiting portion includes an exiting-light diffusion portion configured to diffuse the light exiting through the light exiting portion.

9. The optical lens according to claim 1, further comprising:
an incident light attenuation portion provided on a lens end portion of the optical lens at a side opposite to a side at which the light exiting portion is located, the incident light attenuation portion configured to attenuate light intensity of light incident on the optical lens.

10. The optical lens according to claim 1, wherein the optical lens satisfies Formula (1):

$$H1 \leq H3 \leq H2 \tag{1}$$

where H1 represents a distance in a direction along the lens center axis from a lens end portion of the optical lens at a side opposite to the light exiting portion to an end portion of the first light incident portion in a direction orthogonal to the lens center axis of the optical lens, H2 represents a distance in a direction along the lens center axis from the lens end portion to an end portion of the second total reflecting portion in a direction orthogonal to the lens center axis, and H3 represents a distance in a direction along the lens center axis from the lens end portion to an intersection point where the lens center axis and the first total reflecting portion intersect.

11. The optical lens according to claim 1, wherein the first total reflecting portion includes a surface that expands away from a lens center axis in a direction opposite to a direction toward the light source along the lens center axis of the optical lens; and the optical lens satisfies Formula (2):

$$\sin(\pi/2 - \theta) \geq n2/n1 \tag{2}$$

where $\theta$ represents an angle in a plane in which the lens center axis extends defined by the lens center axis and the first total reflecting portion, $\pi$ represents pi, n1 represents a refractive index of the optical lens, and n2 represents a refractive index of a medium opposite to the optical lens with respect to the first total reflecting portion as an interface therebetween.

12. A lighting device comprising:
the optical lens according to claim 1; and
the light source.

13. The optical lens according to claim 7, further comprising:
an exiting-side recess portion recessed from the light exiting portion, wherein
the exiting-side recess portion includes a side surface portion, a boundary portion, and a bottom surface portion located closer to the light source than the side surface portion with the boundary portion located between the side surface portion and the side surface portion; and
the reflected light attenuation portion includes a reflected light diffusion portion in the side surface portion, the reflected light diffusion portion configured to diffuse the light reflected at the second light incident portion.

14. The optical lens according to claim 7, further comprising:
an exiting-side recess portion recessed from the light exiting portion, wherein
the reflected light attenuation portion includes a light absorbing portion adapted to absorb the light reflected at the second light incident portion, the light absorbing portion contained in the exiting-side recess portion.

15. An optical lens, comprising:
a first light incident portion on which a narrow-angle light from a light source is incident;
a second light incident portion on which a wide-angle light from the light source is incident;
a first total reflecting portion configured to totally reflect the light incident on the first light incident portion;
a second total reflecting portion configured to totally reflect the light incident on the second light incident portion, the second total reflecting portion being configured to transmit light totally reflected at the first total reflecting portion such that the light totally reflected at the first total reflecting portion passes through the second total reflecting portion;
a third light incident portion on which the light that passes through the second total reflecting portion is incident;
a third total reflecting portion configured to totally reflect the light incident on the third light incident portion; and
a light exiting portion through which light totally reflected at the second total reflecting portion exits and through which light totally reflected at the third total reflecting portion exits.

16. The optical lens according to claim 15, wherein the third light incident portion and the third total reflecting portion are located on an outer periphery of the optical lens in relation to a lens center axis of the optical lens.

17. The optical lens according to claim 15, further comprising:
a transmitted light shielding portion that shields the light that passes through the second total reflecting portion.

18. The optical lens according to claim 15, further comprising:
an exiting-side recess portion recessed from the light exiting portion, wherein
the exiting-side recess portion includes a lateral surface portion, a boundary portion, and a bottom surface portion located closer to the light source than the lateral surface portion with the boundary portion located between the lateral surface portion and the bottom surface portion; and
the first total reflecting portion is provided in the bottom surface portion.

19. The optical lens according to claim 15, wherein a region of the first total reflecting portion along a lens center axis of the optical lens is included within a region of the second total reflecting portion along the lens center axis of the optical lens.

20. The optical lens according to claim 15, further comprising:
a reflected light attenuation portion configured to attenuate light intensity of light reflected at the second light incident portion.

* * * * *